US012580806B2

(12) United States Patent
Chen et al.

(10) Patent No.: US 12,580,806 B2
(45) Date of Patent: Mar. 17, 2026

(54) NETWORK FAULT ANALYSIS METHOD AND APPARATUS, DEVICE, AND STORAGE MEDIUM

(71) Applicant: Huawei Technologies Co., Ltd., Shenzhen (CN)

(72) Inventors: Xiaolong Chen, Nanjing (CN); Yuming Xie, Nanjing (CN); Xin Xiao, Nanjing (CN); Yunpeng Gao, Nanjing (CN); Dakun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 270 days.

(21) Appl. No.: 18/496,426

(22) Filed: Oct. 27, 2023

(65) Prior Publication Data

US 2024/0056345 A1 Feb. 15, 2024

Related U.S. Application Data

(63) Continuation of application No. PCT/CN2022/085367, filed on Apr. 6, 2022.

(30) Foreign Application Priority Data

Apr. 30, 2021 (CN) .......................... 202110482854.8

(51) Int. Cl.
*H04L 41/0631* (2022.01)

(52) U.S. Cl.
CPC ................................ *H04L 41/0631* (2013.01)

(58) Field of Classification Search
CPC ............... H04L 41/0631; H04L 41/145; H04L 43/10; H04L 43/16; G06F 11/0709; G06F 11/0775; G06F 11/0778; G06F 11/079
See application file for complete search history.

(56) References Cited

U.S. PATENT DOCUMENTS

| | | | |
|---|---|---|---|
| 2011/0246835 A1 | 10/2011 | Hasegawa et al. | |
| 2012/0053778 A1* | 3/2012 | Colvin ................ | G06F 11/0739 |
| | | | 701/31.4 |
| 2018/0260266 A1* | 9/2018 | Liu ......................... | G06F 16/00 |
| 2020/0106660 A1 | 4/2020 | Kakani et al. | |

* cited by examiner

*Primary Examiner* — Sun Jong Kim

(74) *Attorney, Agent, or Firm* — Slater Matsil, LLP

(57) ABSTRACT

This application discloses a network fault analysis method and apparatus. The method includes: obtaining information about a first abnormal event and information about a second abnormal event; determining first fault cause description information and second fault cause description information respectively based on the information about the first abnormal event and the information about the second abnormal event, where each of the first and the second fault cause description information is used to describe a cause of occurrence of a corresponding abnormal event; and determining, based on event identifiers in the information about the first and the second abnormal events, and the first and the second fault cause description information, that the first abnormal event corresponding to the first fault cause description information is a cause event that causes occurrence of the second abnormal event corresponding to the second fault cause description information.

18 Claims, 8 Drawing Sheets

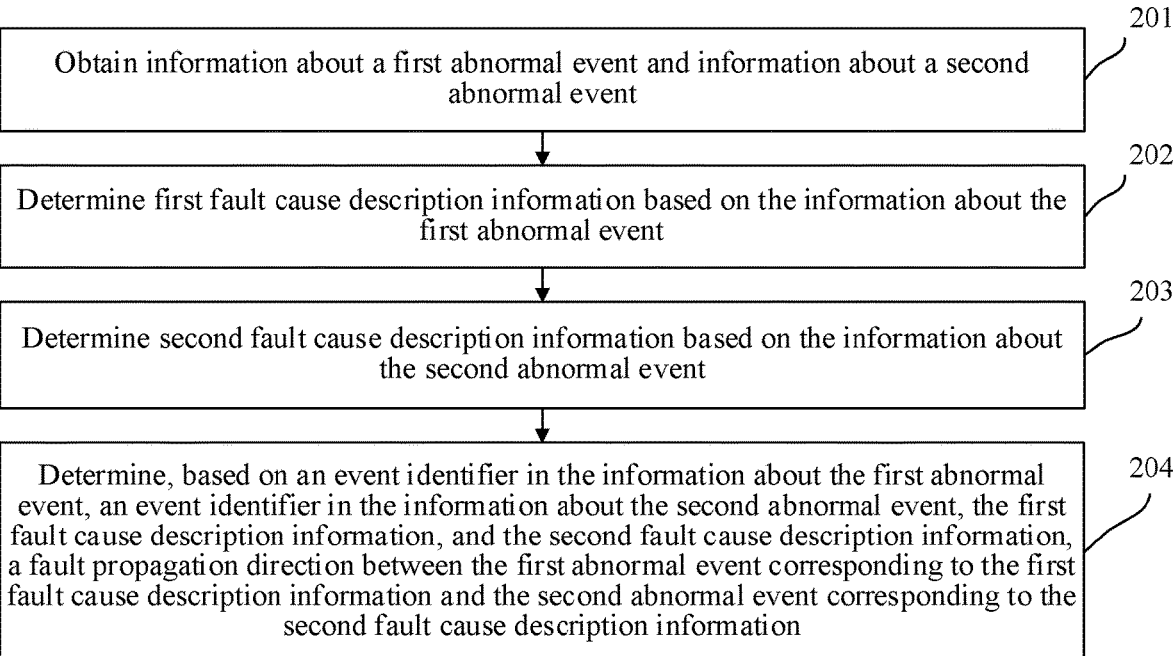

201

Obtain information about a first abnormal event and information about a second abnormal event

202

Determine first fault cause description information based on the information about the first abnormal event

203

Determine second fault cause description information based on the information about the second abnormal event

204

Determine, based on an event identifier in the information about the first abnormal event, an event identifier in the information about the second abnormal event, the first fault cause description information, and the second fault cause description information, a fault propagation direction between the first abnormal event corresponding to the first fault cause description information and the second abnormal event corresponding to the second fault cause description information

FIG. 4

NETWORK FAULT ANALYSIS METHOD AND APPARATUS, DEVICE, AND STORAGE MEDIUM

CROSS-REFERENCE TO RELATED APPLICATIONS

This application is a continuation of International Application No. PCT/CN2022/085367, filed on Apr. 6, 2022, which claims priority to Chinese Patent Application No. 202110482854.8, filed on Apr. 30, 2021. The disclosures of the aforementioned applications are hereby incorporated by reference in their entireties.

TECHNICAL FIELD

This application relates to the field of network technologies, and in particular, to a network fault analysis method and apparatus, a device, and a storage medium.

BACKGROUND

A network fault refers to a situation in which a network cannot provide a normal service or quality of service is degraded due to a hardware problem, a software problem, a network attack, or the like. When a network fault occurs, a network device reports information about an abnormal event such as an alarm or a log. A fault cause can be determined by performing network fault analysis based on the information about the abnormal event reported by the network device.

In a related technology, the information about the abnormal event includes at least an identifier of the abnormal event. In network fault analysis, abnormal events with a same identifier are usually first classified as a same type of abnormal events, and then an association relationship between different types of abnormal events is analyzed to obtain a fault cause.

However, abnormal events with a same identifier may be caused by different reasons. Therefore, accuracy of a network fault analysis result obtained in this manner is low.

SUMMARY

Embodiments of this application provide a network fault analysis method and apparatus, a device, and a storage medium, to improve accuracy of a network fault analysis result.

According to a first aspect, this application provides a network fault analysis method. The method includes: First, information about a first abnormal event and information about a second abnormal event are obtained, where each of the information about the first abnormal event and the information about the second abnormal event includes an event identifier, event description information, and the like. Then, first fault cause description information is determined based on the first abnormal event, and second fault cause description information is determined based on the second abnormal event. The first fault cause description information is used to describe a cause of occurrence of the first abnormal event; and the second fault cause description information is used to describe a cause of occurrence of the second abnormal event. Finally, a fault propagation direction between the first abnormal event corresponding to the first fault cause description information and the second abnormal event corresponding to the second fault cause description information is determined based on an event identifier in the information about the first abnormal event, an event identifier in the information about the second abnormal event, the first fault cause description information, and the second fault cause description information. The fault propagation direction is used to indicate a cause event and a result event that are in the first abnormal event corresponding to the first fault cause description information and the second abnormal event corresponding to the second fault cause description information.

In this embodiment of this application, the first fault cause description information used to describe the cause of occurrence of the first abnormal event is determined based on the information about the first abnormal event, and the second fault cause description information used to describe the cause of occurrence of the second abnormal event is determined based on the information about the second abnormal event. When a fault propagation relationship between the first abnormal event and the second abnormal event is considered, not only the identifier of the first abnormal event and the identifier of the second abnormal event are considered, but also the causes of occurrence of the first abnormal event and the second abnormal event are considered, thereby determining that the first abnormal event corresponding to the first fault cause description information is a cause event that causes occurrence of the second abnormal event corresponding to the second fault cause description information, so that a result of determining the fault propagation relationship is more refined and accurate, and accuracy of network fault analysis is improved.

In a possible implementation, each of the first and the second fault cause description information is determined by using an extraction template corresponding to a network device that sends information about a corresponding abnormal event. An extraction template corresponding to each network device includes an event identifier, a fault code keyword, and other content. In some examples, the extraction template further includes a candidate fault code corresponding to the fault code keyword and fault code description information of each candidate fault code. A candidate fault code is a fault code that may correspond to a fault code keyword. One fault code keyword usually corresponds to a plurality of candidate fault codes.

In some examples, a process of determining the first fault cause description information is as follows: First, a first extraction template of a first network device is obtained, where the first network device is a network device that sends the information about the first abnormal event. Then, a fault code is extracted from the information about the first abnormal event based on the same event identifier and fault code keyword that are in the first extraction template and the information about the first abnormal event, to obtain a first extraction result. Finally, the first fault cause description information is determined based on the first extraction result.

In some examples, a process of determining the second fault cause description information is as follows: First, a second extraction template of a second network device is obtained, where the second network device is a network device that sends the information about the second abnormal event. Then, a fault code is extracted from the information about the second abnormal event based on the same event identifier and fault code keyword that are in the second extraction template and the information about the second abnormal event, to obtain a second extraction result. Finally, the second fault cause description information is determined based on the second extraction result.

In this way, by using the first extraction template and the second extraction template, the fault codes in the information about the first abnormal event and the information about the second abnormal event may be automatically extracted and the fault cause description information corresponding to the extracted fault codes may be determined.

In a possible implementation, at least one of the first extraction result or the second extraction result includes at least one fault code.

In a possible implementation, the determining the first fault cause description information based on the first extraction result includes: when the first extraction result includes a fault code, combining the fault code included in the first extraction result and a corresponding fault code keyword, where each combination is one piece of first fault cause description information, so as to obtain at least one piece of first fault cause description information. When the first extraction result does not include a fault code, the event identifier of the first abnormal event is used as the first fault cause description information, or it is determined that the first fault cause description information is empty.

A manner of determining the second fault cause description information based on the second extraction result is the same as a manner of determining the first fault cause description information based on the first extraction result.

In a possible implementation, the determining, based on an event identifier in the information about the first abnormal event, an event identifier in the information about the second abnormal event, the first fault cause description information, and the second fault cause description information, a fault propagation direction between the first abnormal event corresponding to the first fault cause description information and the second abnormal event corresponding to the second fault cause description information includes: obtaining a first fault propagation relationship model, where the first fault propagation relationship model includes a plurality of first fault propagation relationships, and the first fault propagation relationship is used to record a fault propagation direction between two abnormal events in case of corresponding fault cause description information; and in response to determining that a first target fault propagation relationship exists in the first fault propagation relationship model, determining, based on the first target fault propagation relationship, the fault propagation direction between the first abnormal event corresponding to the first fault cause description information and the second abnormal event corresponding to the second fault cause description information, where the first target fault propagation relationship is a first fault propagation relationship that includes the event identifier in the information about the first abnormal event, the event identifier in the information about the second abnormal event, the first fault cause description information, and the second fault cause description information.

By comparing the identifier of the first abnormal event, the identifier of the second abnormal event, the first fault cause description information, and the second fault cause description information with each first fault propagation relationship in the first fault propagation relationship model, the first target fault propagation relationship including the event identifier in the information about the first abnormal event, the event identifier in the information about the second abnormal event, and the first and the second fault cause description information is determined, thereby determining the fault propagation direction between the first abnormal event corresponding to the first fault cause description information and the second abnormal event corresponding to the second fault cause description information, so that the implementation is convenient and simple.

In another possible implementation, if a first target fault propagation relationship does not exist in the first fault propagation relationship model, the determining, based on an event identifier in the information about the first abnormal event, an event identifier in the information about the second abnormal event, the first fault cause description information, and the second fault cause description information, a fault propagation direction between the first abnormal event corresponding to the first fault cause description information and the second abnormal event corresponding to the second fault cause description information includes: obtaining a second fault propagation relationship model, where the second fault propagation relationship model includes a plurality of second fault propagation relationships, the second fault propagation relationship is used to record a possible fault propagation direction between two abnormal events in case of corresponding fault cause description information, and the second fault propagation relationship model is generated based on the first fault propagation relationship model; and in response to determining that a second target fault propagation relationship exists in the second fault propagation relationship model, determining, based on the second target fault propagation relationship, the fault propagation direction between the first abnormal event corresponding to the first fault cause description information and the second abnormal event corresponding to the second fault cause description information, where the second target fault propagation relationship is a second fault propagation relationship that includes the event identifier in the information about the first abnormal event, the event identifier in the information about the second abnormal event, the first fault cause description information, and the second fault cause description information.

When a fault propagation relationship that is between the first abnormal event and the second abnormal event and that is based on the corresponding fault cause description information cannot be determined based on the first fault propagation relationship model, a possible fault propagation relationship that is between the first abnormal event and the second abnormal event and that is based on the corresponding fault cause description information is determined based on the second fault propagation relationship model, so as to provide reference for locating a fault cause.

In a possible implementation, the method further includes: checking the second target fault propagation relationship after determining, based on the second target fault propagation relationship, the fault propagation direction between the first abnormal event corresponding to the first fault cause description information and the second abnormal event corresponding to the second fault cause description information; and updating the first fault propagation relationship model and the second fault propagation relationship model based on the checked second target fault propagation relationship.

After it is determined that the possible fault propagation relationship between the first abnormal event and the second abnormal event passes the check, the first fault propagation relationship model and the second fault propagation relationship model are updated, to enable the first fault propagation relationship model to be more perfect, and improve accuracy of each second fault propagation relationship in the second fault propagation relationship model, so that a subsequent propagation relationship determining result is more accurate.

In some examples, a network management device sends the second target fault propagation relationship to a server, and a cloud device checks the second target fault propagation relationship, updates the first fault propagation relationship model and the second fault propagation relationship model based on the checked second target fault propagation relationship, and then sends the updated first fault propagation relationship model and the updated second fault propagation relationship model to the network management device.

Optionally, a first fault propagation relationship in the first fault propagation relationship model is generated in the following manner: determining a third abnormal event on a first entity, third fault cause description information used to describe a cause of occurrence of the third abnormal event, a fourth abnormal event on a second entity, and fourth fault cause description information used to describe a cause of occurrence of the fourth abnormal event, where the first entity and the second entity are mutually associated; and determining, based on expert annotation, a cause event and a result event that are in the third abnormal event corresponding to the third fault cause description information and the fourth abnormal event corresponding to the fourth fault cause description information, to obtain the first fault propagation relationship.

Optionally, a second fault propagation relationship in the second fault propagation relationship model is generated in the following manner: determining a fifth abnormal event with unknown fault cause description information, where the unknown fault cause description information is fault cause description information of a corresponding abnormal event other than known fault cause description information, and the known fault cause description information is fault cause description information in a first fault propagation relationship associated with the corresponding abnormal event; calculating a first similarity between the unknown fault cause description information of the fifth abnormal event and each piece of known fault cause description information of the fifth abnormal event, to obtain a first similarity set; and determining, based on the first similarity set, a probability that a second fault propagation relationship corresponding to the fifth abnormal event in case of the unknown fault cause description information is established.

The fifth abnormal event is any abnormal event having unknown fault cause description information. In some examples, the fifth abnormal event has known fault cause description information that exists in the first fault propagation relationship model and unknown fault cause description information that exists in a corresponding extraction template but does not exist in the first fault propagation relationship model.

Optionally, there are two types of second fault propagation relationships corresponding to the fifth abnormal event in case of the unknown fault cause description information. The first type is a second fault propagation relationship that is between the fifth abnormal event and the sixth abnormal event and that is based on the unknown fault cause description information of the fifth abnormal event and the unknown fault cause description information of the sixth abnormal event; and the second type is a second fault propagation relationship that is between the fifth abnormal event and the sixth abnormal event and that is based on the unknown fault cause description information of the fifth abnormal event and the known fault cause description information of the sixth abnormal event.

For the first type, when a first similarity greater than a first similarity threshold exists in the first similarity set, a probability that the second fault propagation relationship is established is determined based on the first similarity greater than the first similarity threshold in the first similarity set and a second similarity greater than a second similarity threshold in a second similarity set, where the second similarity set is a set of second similarities between the unknown fault cause description information of the sixth abnormal event and all known fault cause description information of the sixth abnormal event. When none of first similarities in the first similarity set is greater than the first similarity threshold, a probability that the second fault propagation relationship is established is determined based on a quantity of first fault propagation relationships associated with the fifth abnormal event and the sixth abnormal event.

For the second type, when a first similarity greater than a first similarity threshold exists in the first similarity set, a probability that the second fault propagation relationship is established is determined based on the first similarity greater than the first similarity threshold in the first similarity set. When none of first similarities in the first similarity set is greater than the first similarity threshold, a probability that the second fault propagation relationship is established is determined based on a quantity of first fault propagation relationships associated with the fifth abnormal event and the sixth abnormal event.

In this embodiment of this application, when a fault code in fault cause description information is in a string format, a similarity between the unknown fault cause description information and the known fault cause description information is a similarity between fault codes in the string format. When a fault code in fault cause description information is in a non-string format, for example, a long integer format, a similarity between the unknown fault cause description information and the known fault cause description information is a similarity between pieces of fault code description information corresponding to fault codes.

In some examples, the probability that the second fault propagation relationship is established includes at least one of a first probability and a second probability, where the first probability is a probability that the fifth abnormal event causes the sixth abnormal event, and the second probability is a probability that the sixth abnormal event causes the fifth abnormal event.

In some examples, the calculating a first probability based on a first similarity greater than a first similarity threshold in the first similarity set and a second similarity greater than a second similarity threshold in the second similarity set includes: determining first fault propagation relationships between the fifth abnormal event associated with known fault cause description information corresponding to first similarities greater than the first similarity threshold and the sixth abnormal event associated with known fault cause description information corresponding to second similarities greater than the second similarity threshold, to obtain a first relationship set; determining, based on first similarities and second similarities that correspond to the first fault propagation relationships in the first relationship set, first weights corresponding to the first fault propagation relationships in the first relationship set; determining, based on first similarities and second similarities that correspond to first fault propagation relationships that are in the first relationship set and that indicate that the fifth abnormal event causes the sixth abnormal event, second weights corresponding to the first fault propagation relationships that are in the first relationship set and that indicate that the fifth abnormal event causes the sixth abnormal event; and calculating the first similarity based on a sum of the first weights corresponding to the first fault propagation relationships in the first relationship set and a sum of the second weights corresponding to the first fault propagation relationships in the first relationship set.

In some examples, the calculating a second probability based on a first similarity greater than a first similarity threshold in the first similarity set and a second similarity greater than a second similarity threshold in a second similarity set includes: determining first fault propagation relationships between the fifth abnormal event associated with known fault cause description information corresponding to first similarities greater than the first similarity threshold and the sixth abnormal event associated with known fault cause description information corresponding to second similarities greater than the second similarity threshold, to obtain a first relationship set; determining, based on first similarities and second similarities that correspond to the first fault propagation relationships in the first relationship set, first weights corresponding to the first fault propagation relationships in the first relationship set; determining, based on first similarities and second similarities that correspond to first fault propagation relationships that are in the first relationship set and that indicate that the sixth abnormal event causes the fifth abnormal event, fifth weights corresponding to first fault propagation relationships that are in the first relationship set and that indicate that the sixth abnormal event causes the fifth abnormal event; and calculating the second probability based on a sum of the first weights corresponding to the first fault propagation relationships in the first relationship set and a sum of the fifth weights corresponding to the first fault propagation relationships in the first relationship set.

In some examples, the determining, based on the first similarity greater than the first similarity threshold in the first similarity set, the probability that the second fault propagation relationship that is between the fifth abnormal event and the sixth abnormal event and that is based on the unknown fault cause description information of the fifth abnormal event and the known fault cause description information of the sixth abnormal event is established includes: determining first fault propagation relationships associated with known fault cause description information of the fifth abnormal event corresponding to first similarities greater than the first similarity threshold and known fault cause description information of the sixth abnormal event, to obtain a second relationship set; determining, based on first similarities that correspond to the first fault propagation relationships in the second relationship set, first weights corresponding to the first fault propagation relationships in the second relationship set; determining, based on first similarities that correspond to first fault propagation relationships that are in the second relationship set and that indicate that the fifth abnormal event causes the sixth abnormal event, second weights corresponding to the first fault propagation relationships that are in the second relationship set and that indicate that the fifth abnormal event causes the sixth abnormal event; and calculating, based on a sum of the first weights corresponding to the first fault propagation relationships in the second relationship set and a sum of the second weights corresponding to the first fault propagation relationships in the second relationship set, a probability that the fifth abnormal event causes the sixth abnormal event.

In some examples, the determining, based on the first similarity greater than the first similarity threshold in the first similarity set, the probability that the second fault propagation relationship that is between the fifth abnormal event and the sixth abnormal event and that is based on the unknown fault cause description information of the fifth abnormal event and the known fault cause description information of the sixth abnormal event is established includes: determining first fault propagation relationships associated with known fault cause description information of the fifth abnormal event corresponding to first similarities greater than the first similarity threshold and known fault cause description information of the sixth abnormal event, to obtain a second relationship set; determining, based on first similarities that correspond to the first fault propagation relationships in the second relationship set, first weights corresponding to the first fault propagation relationships in the second relationship set; determining, based on first similarities that correspond to first fault propagation relationships that are in the second relationship set and that indicate that the sixth abnormal event causes the fifth abnormal event, fifth weights corresponding to the first fault propagation relationships that are in the second relationship set and that indicate that the sixth abnormal event causes the fifth abnormal event; and calculating, based on a sum of the first weights corresponding to the first fault propagation relationships in the second relationship set and a sum of the fifth weights corresponding to the first fault propagation relationships in the second relationship set, a probability that the sixth abnormal event causes the fifth abnormal event.

Optionally, the method further includes: determining a cause description keyword in a product manual of a target network device; extracting template content from the product manual of the target network device based on the cause description keyword; and generating a target extraction template based on the template content, where the target network device is the first network device, and the target extraction template is the first extraction template; or the target network device is the second network device, and the target extraction template is the second extraction template.

According to a second aspect, a network fault analysis method is provided. The method includes: determining entities associated with a plurality of abnormal events to obtain an entity set; determining, by using the method according to the first aspect, a fault propagation direction between a seventh abnormal event associated with a third entity and an eighth abnormal event associated with a fourth entity in case of corresponding fault cause description information, where the third entity and the fourth entity are any two mutually associated entities in the entity set, the seventh abnormal event is any one of at least one abnormal event associated with the third entity, and the eighth abnormal event is any one of at least one abnormal event associated with the fourth entity; and determining a root cause event in the plurality of abnormal events based on the determined fault propagation direction.

When a network fault occurs, a plurality of abnormal events occur. The plurality of abnormal events are associated with a plurality of entities, and each entity is associated with at least one abnormal event. In this case, in addition to a causal relationship between any two abnormal events on two associated entities, a root cause event in the plurality of abnormal events needs to be determined, to make it convenient for a skilled person to rectify the fault. Based on the network fault method provided in this embodiment of this application, the root cause event in the plurality of abnormal events can be accurately determined, to locate the network fault.

In some examples, the determining a root cause event in the plurality of abnormal events based on the determined fault propagation direction includes: determining a reference value of each of the abnormal events based on the determined fault propagation direction, where the reference value is a sum of weights of fault propagation directions in which the abnormal event is used as a result event, and the weight of the fault propagation direction is used to indicate a probability that a corresponding fault propagation direction is true; and determining an abnormal event with a minimum reference value as the root cause event in the plurality of abnormal events.

Optionally, when a fault propagation direction is determined based on the first fault propagation relationship model, a weight of the fault propagation direction is 1. When a fault propagation direction is determined based on the second fault propagation relationship model, a weight of the fault propagation direction is a probability corresponding to a corresponding second fault propagation relationship.

According to a third aspect, a network fault analysis apparatus is provided. The apparatus includes an obtaining module, a first determining module, and a second determining module. The obtaining module is configured to obtain information about a first abnormal event and information about a second abnormal event. The first determining module is configured to: determine first fault cause description information based on the information about the first abnormal event, and determine second fault cause description information based on the information about the second abnormal event, where the first fault cause description information is used to describe a cause of occurrence of the first abnormal event, and the second fault cause description information is used to describe a cause of occurrence of the second abnormal event. The second determining module is configured to determine, based on an event identifier in the information about the first abnormal event, an event identifier in the information about the second abnormal event, the first fault cause description information, and the second fault cause description information, a fault propagation direction between the first abnormal event corresponding to the first fault cause description information and the second abnormal event corresponding to the second fault cause description information.

In a possible implementation, the first determining module includes: a template obtaining submodule, an extraction submodule, and an information determining submodule. The template obtaining submodule is configured to obtain a first extraction template of a first network device and a second extraction template of a second network device, where the first network device is a network device that sends the information about the first abnormal event, the second network device is a network device that sends the information about the second abnormal event, and each of the first extraction template and the second extraction template includes an event identifier and a fault code keyword. The extraction submodule is configured to: extract a fault code from the information about the first abnormal event based on the same event identifier and fault code keyword that are in the first extraction template and the information about the first abnormal event, to obtain a first extraction result; and extract a fault code from the information about the second abnormal event based on the same event identifier and fault code keyword that are in the second extraction template and the information about the second abnormal event, to obtain a second extraction result. The information determining submodule is configured to: determine the first fault cause description information based on the first extraction result, and determine the second fault cause description information based on the second extraction result.

In a possible implementation, the second determining module includes: a first model obtaining submodule and a first relationship determining submodule. The first model obtaining submodule is configured to obtain a first fault propagation relationship model, where the first fault propagation relationship model includes a plurality of first fault propagation relationships, and the first fault propagation relationship is used to record a fault propagation direction between two abnormal events in case of corresponding fault cause description information. The first relationship determining submodule is configured to: in response to determining that a first target fault propagation relationship exists in the first fault propagation relationship model, determine, based on the first target fault propagation relationship, a fault propagation direction between the first abnormal event corresponding to the first fault cause description information and the second abnormal event corresponding to the second fault cause description information, where the first target fault propagation relationship is a first fault propagation relationship that includes the event identifier in the information about the first abnormal event, the event identifier in the information about the second abnormal event, the first fault cause description information, and the second fault cause description information.

In another possible implementation, the second determining module includes: a first model obtaining submodule, a second model obtaining submodule, and a second relationship determining submodule. The first model obtaining submodule is configured to obtain a first fault propagation relationship model, where the first fault propagation relationship model includes a plurality of first fault propagation relationships, and the first fault propagation relationship is used to record a fault propagation direction between two abnormal events in case of corresponding fault cause description information. The second model obtaining submodule is configured to: in response to determining that a first target fault propagation relationship does not exist in the first fault propagation relationship model, obtain a second fault propagation relationship model, where the second fault propagation relationship model includes a plurality of second fault propagation relationships, the second fault propagation relationship is used to record a possible fault propagation direction between two abnormal events in case of corresponding fault cause description information, and the second fault propagation relationship model is generated based on the first fault propagation relationship model. The second relationship determining submodule is configured to: in response to determining that a second target fault propagation relationship exists in the second fault propagation relationship model, determine, based on the second target fault propagation relationship, the fault propagation direction between the first abnormal event corresponding to the first fault cause description information and the second abnormal event corresponding to the second fault cause description information, where the second target fault propagation relationship is a second fault propagation relationship that includes the event identifier in the information about the first abnormal event, the event identifier in the information about the second abnormal event, the first fault cause description information, and the second fault cause description information.

Optionally, the apparatus further includes: a check module and an update module. The check module is configured to check the second target fault propagation relationship after the second relationship determining submodule determines, based on the second target fault propagation relationship, the fault propagation direction between the first abnormal event corresponding to the first fault cause description information and the second abnormal event corresponding to the second fault cause description information. The update module is configured to update the first fault propagation relationship model and the second fault propagation relationship model based on the checked second target fault propagation relationship.

Optionally, the apparatus further includes a first generation module. The first generation module is configured to generate a first fault propagation relationship in the first fault propagation relationship model in the following manner: determining a third abnormal event on a first entity, third fault cause description information used to describe a cause of occurrence of the third abnormal event, a fourth abnormal event on a second entity, and fourth fault cause description information used to describe a cause of occurrence of the fourth abnormal event, where the first entity and the second entity are mutually associated; and determining, based on expert annotation, a cause event and a result event that are in the third abnormal event corresponding to the third fault cause description information and the fourth abnormal event corresponding to the fourth fault cause description information, to obtain the first fault propagation relationship.

Optionally, the apparatus further includes a second generation module. The second generation module is configured to generate a second fault propagation relationship in the second fault propagation relationship model in the following manner: determining a fifth abnormal event with unknown fault cause description information, where the unknown fault cause description information is fault cause description information of a corresponding abnormal event other than known fault cause description information, and the known fault cause description information is fault cause description information in a first fault propagation relationship associated with the corresponding abnormal event; calculating a first similarity between the unknown fault cause description information of the fifth abnormal event and each piece of known fault cause description information of the fifth abnormal event, to obtain a first similarity set; and determining, based on the first similarity set, a probability that a second fault propagation relationship corresponding to the fifth abnormal event in case of the unknown fault cause description information is established.

In some examples, the second generation module is configured to determine, through at least one of the following and based on the first similarity set, a probability that a second fault propagation relationship corresponding to the fifth abnormal event in case of the unknown fault cause description information is established:

determining, based on a first similarity greater than a first similarity threshold in the first similarity set and a second similarity greater than a second similarity threshold in a second similarity set, a probability that a second fault propagation relationship that is between the fifth abnormal event and a sixth abnormal event and that is based on the unknown fault cause description information of the fifth abnormal event and unknown fault cause description information of the sixth abnormal event is established, where the second similarity set is a set of second similarities between the unknown fault cause description information of the sixth abnormal event and all known fault cause description information of the sixth abnormal event;

determining, based on the first similarity greater than the first similarity threshold in the first similarity set, the probability that the second fault propagation relationship that is between the fifth abnormal event and the sixth abnormal event and that is based on the unknown fault cause description information of the fifth abnormal event and the known fault cause description information of the sixth abnormal event is established;

in response to determining that none of first similarities in the first similarity set is greater than the first similarity threshold, determining, based on a quantity of first fault propagation relationships associated with the fifth abnormal event and the sixth abnormal event, the probability that the second fault propagation relationship that is between the fifth abnormal event and the sixth abnormal event and that is based on the unknown fault cause description information of the fifth abnormal event and the unknown fault cause description information of the sixth abnormal event is established; and in response to determining that none of the first similarities in the first similarity set is greater than the first similarity threshold, determining, based on the quantity of the first fault propagation relationships associated with the fifth abnormal event and the sixth abnormal event, the probability that the second fault propagation relationship that is between the fifth abnormal event and the sixth abnormal event and that is based on the unknown fault cause description information of the fifth abnormal event and the known fault cause description information of the sixth abnormal event.

In some examples, the second generation module is configured to: determine first fault propagation relationships between the fifth abnormal event associated with known fault cause description information corresponding to first similarities greater than the first similarity threshold and the sixth abnormal event associated with known fault cause description information corresponding to second similarities greater than the second similarity threshold, to obtain a first relationship set; determine, based on first similarities and second similarities that correspond to the first fault propagation relationships in the first relationship set, first weights corresponding to the first fault propagation relationships in the first relationship set; determine, based on first similarities and second similarities that correspond to first fault propagation relationships that are in the first relationship set and that indicate that the fifth abnormal event causes the sixth abnormal event, second weights corresponding to the first fault propagation relationships that are in the first relationship set and that indicate that the fifth abnormal event causes the sixth abnormal event; and calculate, based on a sum of the first weights corresponding to the first fault propagation relationships in the first relationship set and a sum of the second weights corresponding to the first fault propagation relationships in the first relationship set, a probability that the fifth abnormal event causes the sixth abnormal event.

In some examples, the second generation module is configured to: determine first fault propagation relationships between the fifth abnormal event associated with known fault cause description information corresponding to first similarities greater than the first similarity threshold and the sixth abnormal event associated with known fault cause description information corresponding to second similarities greater than the second similarity threshold, to obtain a first relationship set; determine, based on first similarities and second similarities that correspond to the first fault propagation relationships in the first relationship set, first weights corresponding to the first fault propagation relationships in the first relationship set; determine, based on first similarities and second similarities that correspond to first fault propagation relationships that are in the first relationship set and that indicate that the sixth abnormal event causes the fifth abnormal event, fifth weights corresponding to first fault propagation relationships that are in the first relationship set and that indicate that the sixth abnormal event causes the fifth abnormal event; and calculate, based on a sum of the first weights corresponding to the first fault propagation relationships in the first relationship set and a sum of the fifth weights corresponding to the first fault propagation relationships in the first relationship set, a probability that the sixth abnormal event causes the fifth abnormal event.

In some examples, the second generation module is configured to: determine first fault propagation relationships associated with known fault cause description information of the fifth abnormal event corresponding to first similarities greater than the first similarity threshold and known fault cause description information of the sixth abnormal event, to obtain a second relationship set; determine, based on first similarities that correspond to the first fault propagation relationships in the second relationship set, first weights corresponding to the first fault propagation relationships in the second relationship set; determine, based on first similarities that correspond to first fault propagation relationships that are in the second relationship set and that indicate that the fifth abnormal event causes the sixth abnormal event, second weights corresponding to the first fault propagation relationships that are in the second relationship set and that indicate that the fifth abnormal event causes the sixth abnormal event; and calculate, based on a sum of the first weights corresponding to the first fault propagation relationships in the second relationship set and a sum of the second weights corresponding to the first fault propagation relationships in the second relationship set, a probability that the fifth abnormal event causes the sixth abnormal event; or In some examples, the second generation module is configured to: determine first fault propagation relationships associated with known fault cause description information of the fifth abnormal event corresponding to first similarities greater than the first similarity threshold and known fault cause description information of the sixth abnormal event, to obtain a second relationship set; determine, based on first similarities that correspond to the first fault propagation relationships in the second relationship set, first weights corresponding to the first fault propagation relationships in the second relationship set; determine, based on first similarities that correspond to first fault propagation relationships that are in the second relationship set and that indicate that the sixth abnormal event causes the fifth abnormal event, fifth weights corresponding to the first fault propagation relationships that are in the second relationship set and that indicate that the sixth abnormal event causes the fifth abnormal event; and calculate, based on a sum of the first weights corresponding to the first fault propagation relationships in the second relationship set and a sum of the fifth weights corresponding to the first fault propagation relationships in the second relationship set, a probability that the sixth abnormal event causes the fifth abnormal event.

Optionally, the apparatus further includes: a third generation module, configured to: determine a cause description keyword in a product manual of a target network device; extract template content from the product manual of the target network device based on the cause description keyword; and generate a target extraction template based on the template content, where the target network device is the first network device, and the target extraction template is the first extraction template; or the target network device is the second network device, and the target extraction template is the second extraction template.

According to a fourth aspect, a network fault analysis apparatus is provided. The apparatus includes an entity determining module, a direction determining module, and a root cause event determining module. The entity determining module is configured to determine entities associated with a plurality of abnormal events to obtain an entity set. The direction determining module is configured to determine, by using the method according to the first aspect, a fault propagation direction between a seventh abnormal event associated with a third entity and an eighth abnormal event associated with a fourth entity in case of corresponding fault cause description information, where the third entity and the fourth entity are any two mutually associated entities in the entity set, the seventh abnormal event is any one of at least one abnormal event associated with the third entity, and the eighth abnormal event is any one of at least one abnormal event associated with the fourth entity. The root cause event determining module is configured to determine a root cause event in the plurality of abnormal events based on the determined fault propagation direction.

In some examples, the root cause event determining module includes a reference value determining submodule and a root cause event determining submodule. The reference value determining submodule is configured to determine a reference value of each of the abnormal events based on the determined fault propagation direction, where the reference value is a sum of weights of fault propagation directions in which the abnormal event is used as a result event, and the weight of the fault propagation direction is used to indicate a probability that a corresponding fault propagation direction is true. The root cause event determining submodule is configured to determine an abnormal event with a minimum reference value as the root cause event in the plurality of abnormal events.

According to a fifth aspect, a computer device is provided, where the computer device includes a processor and a memory. The memory stores computer instructions, and the processor executes the computer instructions to implement the method according to the first aspect and the possible implementations of the first aspect.

According to a sixth aspect, a computer-readable storage medium is provided. The computer-readable storage medium stores computer instructions, and when the computer instructions in the computer-readable storage medium are executed by a computer device, the computer device is enabled to perform the method according to the first aspect and the possible implementations of the first aspect.

According to a seventh aspect, a computer program product including instructions is provided. When the computer program product is run on a computer device, the computer device is enabled to perform the method according to the first aspect and the possible implementations of the first aspect.

BRIEF DESCRIPTION OF THE DRAWINGS

FIG. 4 is a flowchart of a network fault analysis method according to an example embodiment of this application;

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

Figure 1:
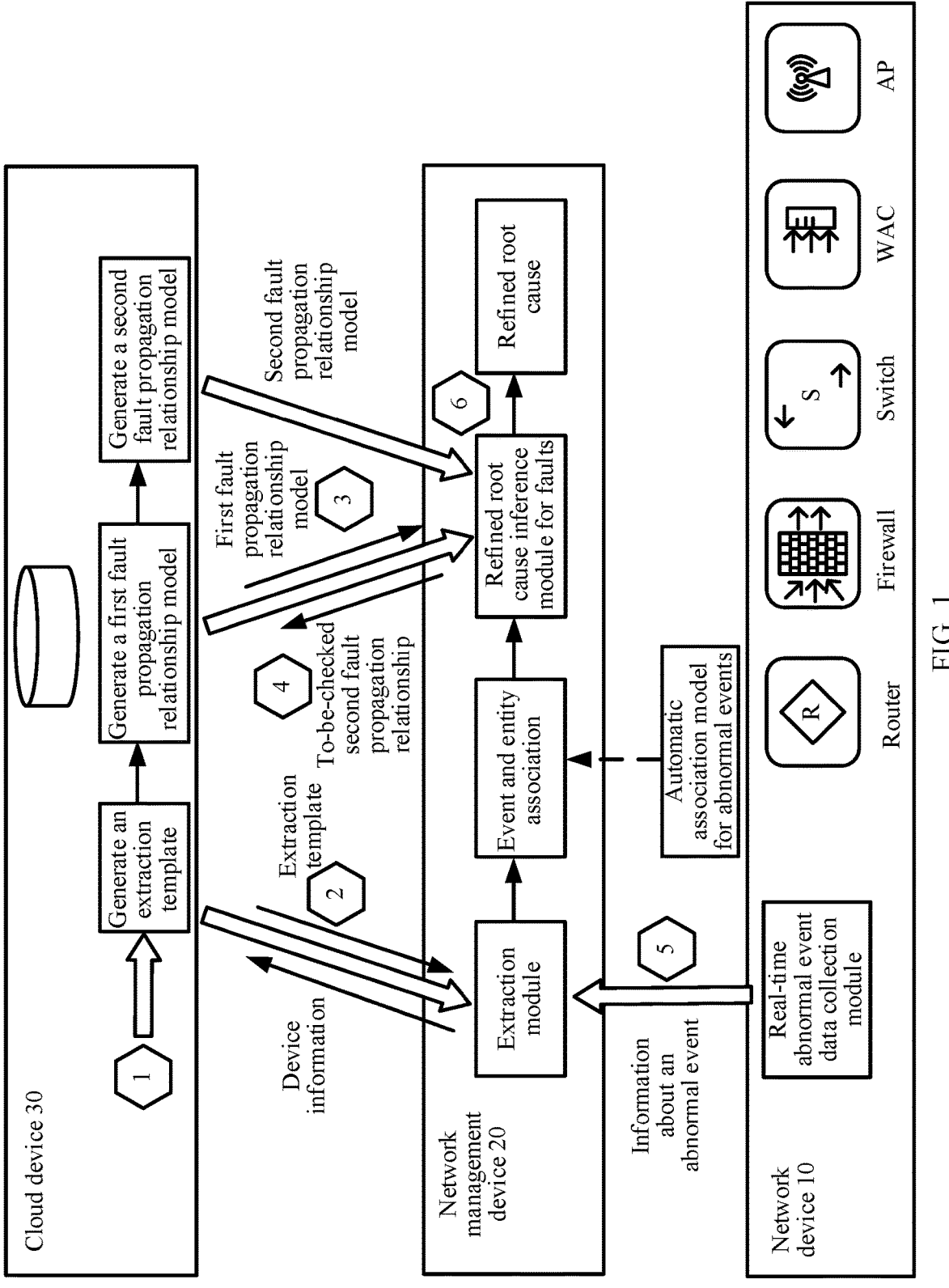
FIG. 1 is a schematic diagram of a network architecture of an application scenario according to an example embodiment of this application.

FIG. 1 is a schematic diagram of a network architecture of an application scenario according to an example embodiment of this application. A network shown in FIG. 1 includes a plurality of network devices 10 and a network management device 20. The network devices 10 are in a communication connection.

The network management device 20 is configured to manage and control each network device 10, parse and present related data of the network device 10, analyze traffic between the network devices 10, perform intelligent maintenance on the network, and the like. In this embodiment of this application, the network management device 20 is a server, a server cluster including several servers, or a cloud computing service center.

The network device 10 includes but is not limited to a router, a switch, an access point (AP), a firewall (FW), a wireless access point controller (WAC), and the like. A type of the network device 10 is set based on an actual requirement.

In this embodiment of this application, the network management device 20 is connected to at least some of the network devices 10, to interact with the connected network devices 10. When a network fault occurs, the network device 10 connected to the network management device 20 reports information about an abnormal event such as an alarm or a log to the network management device. The network management device 20 performs network fault analysis based on the received information about the abnormal event, so as to implement functions such as fault locating and fault troubleshooting.

As shown in FIG. 1, the network architecture further includes a cloud device 30. The cloud device 30 is usually an upper-level device of the network management device 20, and is configured to provide a data processing model and the like for the network management device 20. For example, the data processing model includes an extraction template, a first fault propagation relationship model, a second fault propagation relationship model, and the like. In some other examples, the data processing model of the network is manually configured in the network management device 20. In this embodiment of this application, the cloud device 30 is a server, a server cluster including several servers, or a cloud computing service center.

Optionally, the cloud device 30 and the network management device 20 may alternatively be integrated into one device. This is not limited in this embodiment of this application.

In this embodiment of this application, a type of the network includes but is not limited to a campus network, a data center network (DCN), or the like.

Figure 2:
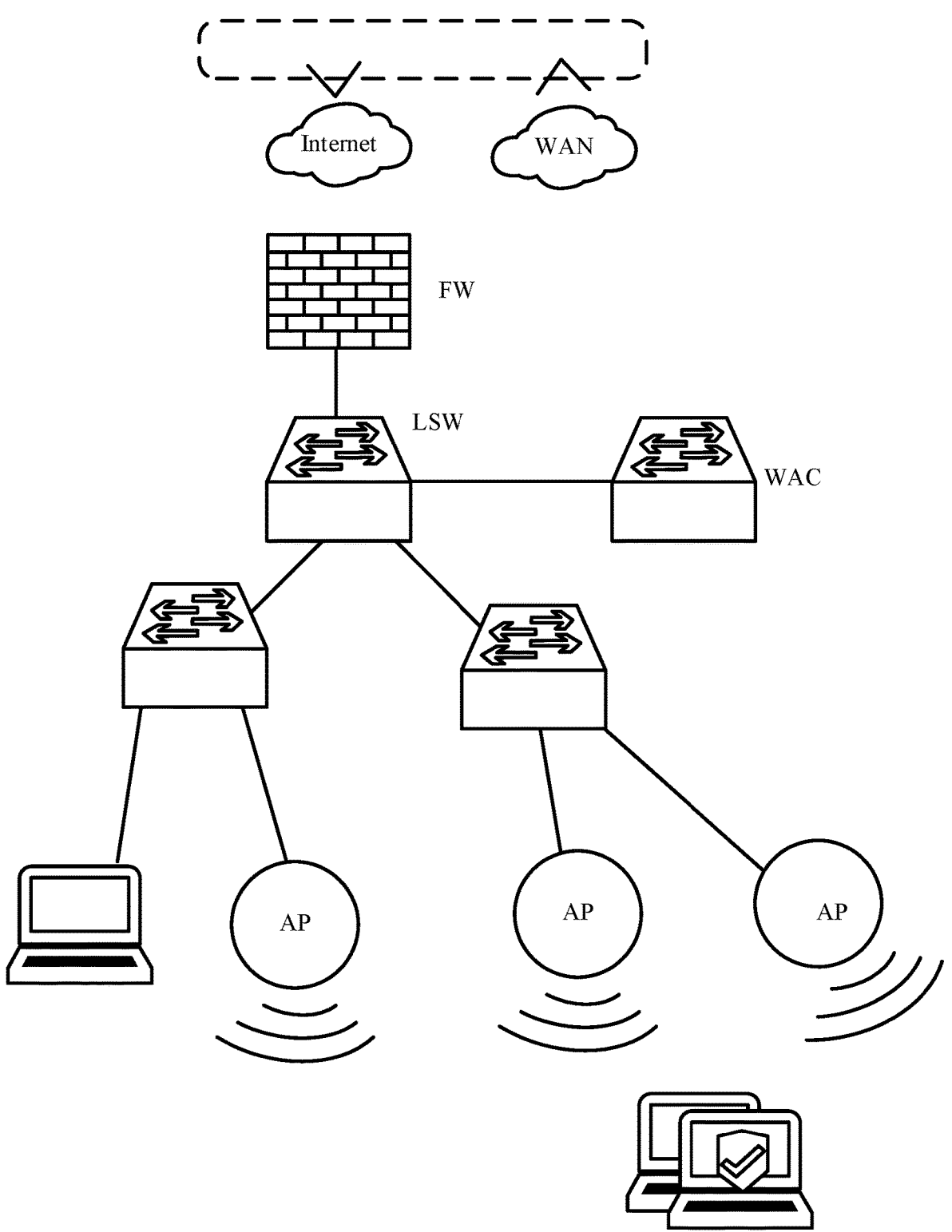
FIG. 2 is a schematic diagram of a network structure of a campus network according to an example embodiment of this application.

FIG. 2 is a schematic diagram of a network structure of a campus network according to an example embodiment of this application. As shown in FIG. 2, network devices in the campus network include an FW, a WAC, a local area network (LAN) switch (LSW), an AP, and the like. The LSW is connected to an external network (the Internet or a wide area network, (WAN)) through the FW.

Figure 3:
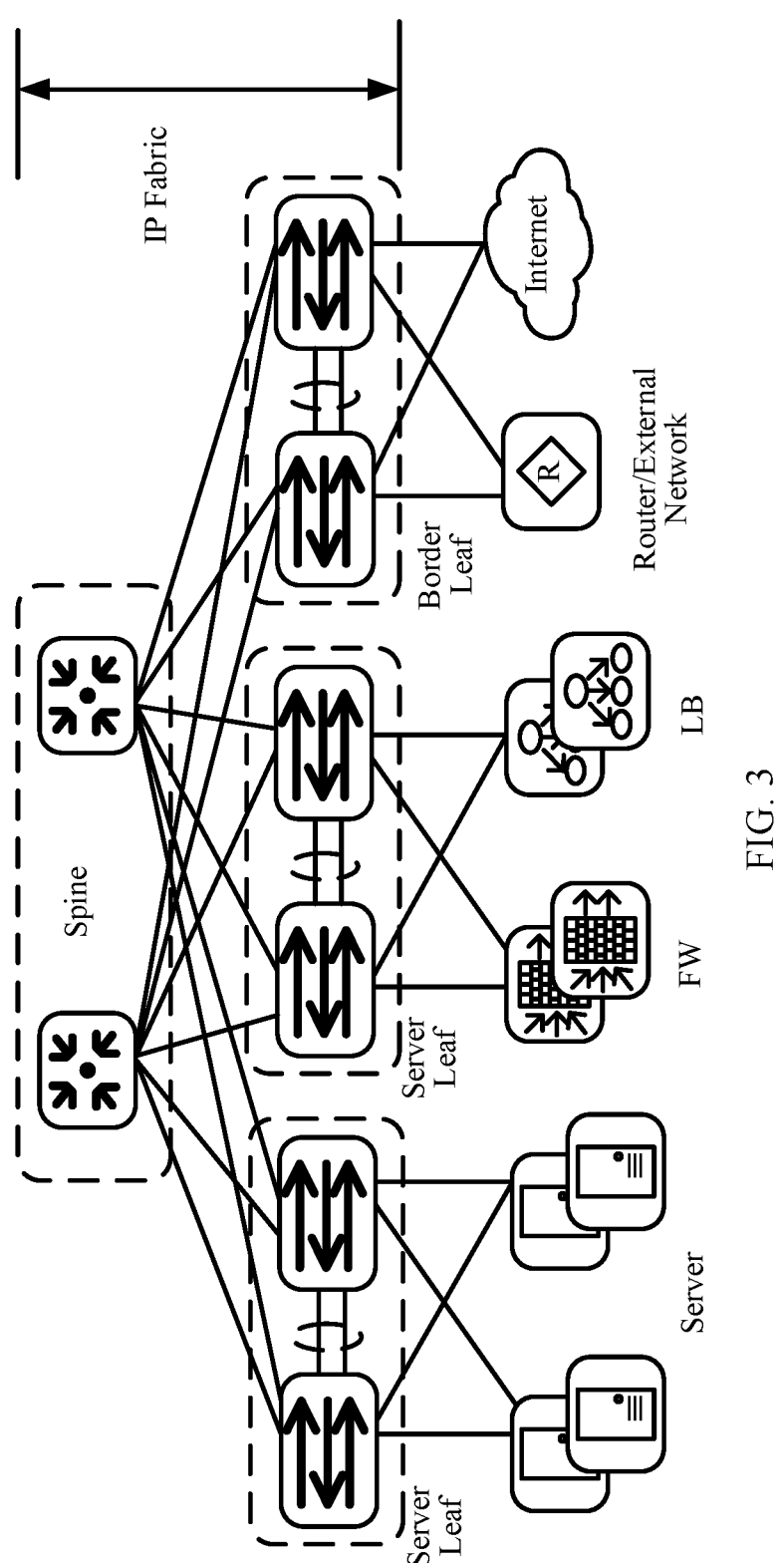
FIG. 3 is a schematic diagram of a network structure of a data center network according to an example embodiment of this application.

FIG. 3 is a schematic diagram of a network structure of a DCN according to an example embodiment of this application. As shown in FIG. 3, network devices in the DCN include an FW, a spine switch, a leaf switch, and the like.

FIG. 4 shows a network fault analysis method according to an example embodiment of this application. The method is performed by a computer device, and the computer device is, for example, the foregoing network management device. As shown in FIG. 4, the method includes the following several processes.

201: Obtain information about a first abnormal event and information about a second abnormal event.

When detecting that a network fault occurs, a network device reports information about a plurality of abnormal events to the network management device. The information about the plurality of abnormal events may come from different network devices. After receiving the information about the plurality of abnormal events, the network management device locally stores the information for subsequent network fault analysis. The information about the first abnormal event and the information about the second abnormal event are two pieces of the information about the plurality of abnormal events received by the network management device.

In this embodiment of this application, information about an abnormal event includes at least device information, an event identifier, and event description information. The device information indicates related information of a network device that sends the information about the corresponding abnormal event. For example, device information includes a device model, a system software version, and the like. Event identifiers such as event names are used to identify different abnormal events. Event description information includes indication information of an entity associated with an abnormal event. The indication information of the entity is, for example, a name of the entity. For example, a type of an entity includes but is not limited to an interface, a component, a protocol, a service, and the like. One network device may correspond to a plurality of entities.

In some examples, the event description information further includes fault cause description information, and the fault cause description information is used to describe a cause of occurrence of a corresponding abnormal event. The fault cause description includes a fault code keyword and a fault code corresponding to the fault code keyword. Fault code keywords include, for example, ErrorCode and Reason. Information about one abnormal event includes one event identifier and at least one fault code keyword, and each fault code keyword corresponds to one fault code. In other words, information about one abnormal event includes at least one fault code. When information about one abnormal event includes a plurality of fault codes, the plurality of fault codes are the same or different.

In some other examples, the event description information does not include a fault code keyword or a fault code, or the information about the abnormal event includes a fault code keyword, but a fault code corresponding to the fault code keyword is empty. In this case, the abnormal event does not correspond to fault cause description information.

In this embodiment of this application, at least one of the information about the first abnormal event and the information about the second abnormal event includes fault cause description information.

For example, the information about the abnormal event is in a form of an alarm and/or a log.

In this embodiment of this application, the first abnormal event and the second abnormal event are two abnormal events caused by a same network fault. Therefore, a spatial and/or temporal association relationship exists between the first abnormal event and the second abnormal event.

The spatial association means that an association relationship exists between a first entity corresponding to the first abnormal event and a second entity corresponding to the second abnormal event. The spatial association relationship includes but is not limited to the following: A number of hops between the first entity and the second entity is within a specified number of hops (for example, within two hops), and the first entity and the second entity are peer entities.

In a possible implementation, the first entity and the second entity belong to different network devices. For example, the first entity belongs to a first network device, and the second entity belongs to a second network device. Correspondingly, the information about the first abnormal event is sent by the first network device, and the information about the second abnormal event is sent by the second network device.

In another possible implementation, the first entity and the second entity belong to a same network device, and the information about the first abnormal event and the information about the second abnormal event are sent by the same network device. In other words, the first network device and the second network device are a same network device.

In some examples, the spatial association relationship is determined in the following manner: determining a corresponding entity based on information about an abnormal event; and determining, based on a network graph, whether an association relationship exists between two entities corresponding to two abnormal events, where the network graph is a relationship network formed by association relationships between entities in the network, and the network graph further includes an identifier of an abnormal event associated with each entity. If an association relationship exists between the two entities corresponding to the two abnormal events, the association relationship may be used as the information about the first abnormal event and the information about the second abnormal event, and a subsequent step is used to determine the association relationship between the first abnormal event and the second abnormal event.

In this embodiment of this application, the network graph is formed in advance based on configuration information of each network device in the network, and an abnormal event reported by the network device is associated with a corresponding entity in the network graph in real time.

The temporal association means that a time corresponding to the first abnormal event is close to a time corresponding to the second abnormal event.

In some examples, a first interval between an occurrence time of the first abnormal event and an occurrence time of the second abnormal event is less than a first interval threshold. Because occurrence times of two abnormal events that have a propagation relationship are usually very close, whether the interval between the occurrence time of the first abnormal event and the occurrence time of the second abnormal event is less than the first interval threshold may be used to indicate whether a propagation relationship may exist between the first abnormal event and the second abnormal event.

Each of the occurrence time of the first abnormal event and the occurrence time of the second abnormal event is determined by the corresponding network device, and is carried in the information about the abnormal event and sent to the network management device, for example, carried in the information about the abnormal event in a timestamp manner.

In some other examples, a second interval between a sending time of the information about the first abnormal event and a sending time of the information about the second abnormal event is less than a second interval threshold; a third interval between a receiving time of the information about the first abnormal event and a receiving time of the information about the second abnormal event is less than a third interval threshold; or a second interval between a sending time of the information about the first abnormal event and a sending time of the information about the second abnormal event is less than a second interval threshold, and a third interval between a receiving time of the information about the first abnormal event and a receiving time of the information about the second abnormal event is less than a third interval threshold.

Each of the sending time of the information about the first abnormal event and the sending time of the information about the second abnormal event refers to a time at which the information is sent by the corresponding network device. The sending time may be carried in the information about the abnormal event and sent to the network management device, for example, carried in the information about the abnormal event in a timestamp manner. Each of the receiving time of the information about the first abnormal event and the receiving time of the information about the second abnormal event refers to a time at which the network management device receives the corresponding information.

Occurrence times of two abnormal events that have a propagation relationship are very close, and the network device monitors occurrence of an abnormal event in real time, and reports information about the abnormal event immediately when detecting that the abnormal event occurs. Therefore, whether the second interval between the sending time of the information about the first abnormal event and the sending time of the information about the second abnormal event and the third interval between the receiving time of the information about the first abnormal event and the receiving time of the information about the second abnormal event are less than corresponding interval thresholds may also be used to indicate whether a propagation relationship may exist between the first abnormal event and the second abnormal event.

The first interval threshold, the second interval threshold, and the third interval threshold are set based on a requirement. This is not limited in this application.

In some examples, 201 includes: determining, based on received information about a plurality of abnormal events, whether a temporal and spatial association relationship exists between any two abnormal events; and using two abnormal events between which a temporal and spatial association relationship exists as the first abnormal event and the second abnormal event, and obtaining the information about the first abnormal event and the information about the second abnormal event.

In some other examples, a plurality of abnormal events between which a temporal and spatial association exists are selected by using a clustering algorithm, for example, a K-means clustering method or a density-based spatial clustering of applications with noise (DBSCAN) algorithm. Any two of the plurality of abnormal events between which a temporal and spatial association exists are respectively the first abnormal event and the second abnormal event.

202: Determine first fault cause description information based on the information about the first abnormal event.

The first fault cause description information is used to describe a cause of occurrence of the first abnormal event.

203: Determine second fault cause description information based on the information about the second abnormal event.

The second fault cause description information is used to describe a cause of occurrence of the second abnormal event.

204: Determine, based on an event identifier in the information about the first abnormal event, an event identifier in the information about the second abnormal event, the first fault cause description information, and the second fault cause description information, a fault propagation direction between the first abnormal event corresponding to the first fault cause description information and the second abnormal event corresponding to the second fault cause description information.

The fault propagation direction is used to indicate a cause event and a result event that are in the first abnormal event corresponding to the first fault cause description information and the second abnormal event corresponding to the second fault cause description information.

In this embodiment of this application, if occurrence of the first abnormal event causes occurrence of the second abnormal event, a fault propagation direction between the first abnormal event and the second abnormal event is propagation from the first abnormal event to the second abnormal event. The first abnormal event may be referred to as a cause event of the second abnormal event, and the second abnormal event may be referred to as a result event of the first abnormal event. If occurrence of the second abnormal event causes occurrence of the first abnormal event, a fault propagation direction between the first abnormal event and the second abnormal event is propagation from the second abnormal event to the first abnormal event. The second abnormal event may be referred to as a cause event of the first abnormal event, and the first abnormal event may be referred to as a result event of the second abnormal event.

In some examples, the identifier of the first abnormal event is the same as the identifier of the second abnormal event. Generally, when the event identifier of the first abnormal event is the same as the event identifier of the second abnormal event, at least one piece different fault cause description information exists in first fault cause description information and second fault cause description information in a case that the first abnormal event is a cause event and first fault cause description information and second fault cause description information in a case that the first abnormal event is a result event.

For example, the first fault cause description information in a case that the first abnormal event is a cause event is completely different from or partially different from the first fault cause description information in a case that the first abnormal event is a result event, and the second fault cause description information in a case that the first abnormal event is a cause event is the same as the second fault cause description information in a case that the first abnormal event is a result event. In another example, the first fault cause description information in a case that the first abnormal event is a cause event is the same as the first fault cause description information in a case that the first abnormal event is a result event, and the second fault cause description information in a case that the first abnormal event is a cause event is completely different from or partially different from the second fault cause description information in a case that the first abnormal event is a result event. In another example, the first fault cause description information in a case that the first abnormal event is a cause event is completely different from or partially different from the first fault cause description information in a case that the first abnormal event is a result event, and the second fault cause description information in a case that the first abnormal event is a cause event is completely different from or partially different from the second fault cause description information in a case that the first abnormal event is a result event.

In this way, the propagation relationship between the first abnormal event and the second abnormal event may be distinguished by using the first fault cause description information corresponding to the first abnormal event and the second fault cause description information corresponding to the second abnormal event.

A description is made below by using an example in which the first fault cause description information in a case that the first abnormal event is a cause event is completely different from the first fault cause description information in a case that the first abnormal event is a result event, and the second fault cause description information in a case that the first abnormal event is a cause event is the same as the second fault cause description information in a case that the first abnormal event is a result event.

The information about the first abnormal event is an alarm caused by down of a switch port in a campus network, an event identifier of the first abnormal event is IF_LINK-DOWN, the information about the second abnormal event is an alarm caused by a fault of an AP connected to the switch port, and an event identifier of the second abnormal event is AP_NORMAL_TO_FAULT. The down of the switch port causes the fault of the AP connected to the switch port, and the fault of the AP causes the down of the switch port connected to the AP. When the down of the switch port causes the fault of the AP connected to the switch port, the first fault cause description information is "Heartbeat packet transmission for the CAPWAP control tunnel between the AC and AP times out". When the fault of the AP causes the down of the switch port connected to the AP, the first fault cause description information is "A command is delivered to reboot an AP".

If the association relationship between the abnormal events is determined based on the identifiers of the abnormal events in the related technology, only a causal relationship between the first abnormal event and the second abnormal event can be determined, but the propagation relationship between the first abnormal event and the second abnormal event cannot be further distinguished. However, in this embodiment of this application, the cause event and the result event in the first abnormal event and the second abnormal event may be distinguished based on the first fault cause description information, so that fault locating is more accurate and refined.

In some other examples, the identifier of the first abnormal event is different from the identifier of the second abnormal event.

It should be noted that when both the first fault cause description information and the second fault cause description information are empty, the propagation relationship between the first abnormal event and the second abnormal event is determined based on the event identifier in the information about the first abnormal event and the event identifier in the information about the second abnormal event. A manner in which the propagation relationship between the first abnormal event and the second abnormal event is determined based on the event identifier in the information about the first abnormal event and the event identifier in the information about the second abnormal event is not limited in this application.

In some examples, 202 includes:

First step: Obtain a first extraction template of the first network device and a second extraction template of the second network device, where each of the first extraction template and the second extraction template includes an event identifier, a fault code keyword, a candidate fault code corresponding to the fault code keyword, and fault code description information of each candidate fault code. A candidate fault code is a fault code that may correspond to a fault code keyword. One fault code keyword usually corresponds to a plurality of candidate fault codes.

Second step: Extract a fault code from the information about the first abnormal event based on the same event identifier and fault code keyword that are in the first extraction template and the information about the first abnormal event, to obtain a first extraction result.

Third step: Extract a fault code from the information about the second abnormal event based on the same event identifier and fault code keyword that are in the second extraction template and the information about the second abnormal event, to obtain a second extraction result.

Fourth step: Determine the first fault cause description information based on the first extraction result, and determine the second fault cause description information based on the second extraction result.

It should be noted that the second step and the third step in 202 are not performed in a sequence, and may be performed in sequence, or may be performed synchronously.

In 202 and 203, each of the fault code in the information about the first abnormal event and the fault code in the information about the second abnormal event is extracted by using a corresponding extraction template. In this embodiment of this application, the extraction template is mainly configured to quickly extract a fault code in information about an abnormal event when the device reports the information about the abnormal event, to obtain fault cause description information corresponding to the fault code, so as to perform refined root cause locating.

To easily understand the extraction process, the following first briefly describes content and a generation manner of the extraction template.

For example, the template content in the extraction template includes an event identifier, a fault code keyword, a fault code variable type, a candidate fault code corresponding to the fault code keyword, and fault code description information corresponding to each candidate fault code. Event identifiers are used to identify different types of abnormal events, and the fault code keyword is used to indicate a fault code name. The fault code variable type is used to indicate a variable type of the fault code corresponding to the fault code keyword, and includes but is not limited to an unsigned long integer (ULONG) and a string (STRING). The candidate fault code is a possible variable value corresponding to the fault code keyword. The fault code description information corresponding to the candidate fault code is used to describe a meaning of the candidate fault code.

In addition to the template content, the extraction template further includes device information. The device information includes but is not limited to a device model and a system software version of the device.

TABLE 1

| Extraction template | | |
|---|---|---|
| Column names | Meaning | Example |
| model | Device model | S12700 |
| version | System software version | V200R011C10 |
| template_content | Template content, including an event identifier, a keyword, a fault code, a fault code variable type, a fault code, fault code description information corresponding to the fault code, and a fault code template type | {<br>"rpc_failed": {<br>    "ErrorCode": {<br>        "value": "ULONG",<br>        "para_desc": [<br>            "2: Message memory allocation fails.",<br>            "3: IPC synchronization times out.",<br>            "4: The message waiting queue overflows."<br>        ],<br>        "type: 2"<br>    }<br>},<br>"ipallocfail": {<br>    "Reason": {<br>        "value": "STRING",<br>        "para_desc": [<br>            "No idle IP address: The |

TABLE 1-continued

| Extraction template | | |
| --- | --- | --- |
| Column names | Meaning | Example |
| | | address pool has no idle IP address.", "Pool is locked: The address pool is locked.", "Exception occurred: System exception." ], "type: 2" } }, ... } |

As shown in Table 1, the extraction template includes the device model "S12700" and the system software version "V200R011C10". The template content of the extraction template includes template content corresponding to a plurality of abnormal events.

In the extraction template, template content corresponding to a first abnormal event includes: an event identifier "rpc_failed", a fault code keyword "ErrorCode", a fault code variable type "value": "ULONG", candidate fault codes, and fault code description information corresponding to the candidate fault codes that includes: "2: Message memory allocation fails"; "3: IPC synchronization times out"; and "4: The message waiting queue overflows".

In the extraction template, template content corresponding to a second abnormal event includes: an event identifier "ipallocfail", a fault code keyword "ErrorCode", a fault code variable type "value": "STRING", candidate fault codes, and fault code description information corresponding to the candidate fault codes that includes: "No idle IP address: The address pool has no idle IP address."; "Pool is locked: The address pool is locked"; and "Exception occurred: System exception".

In this embodiment of this application, a manner of generating an extraction template includes at least one of the following manners.

Manner 1: Obtain a product manual of a target network device, and generate an extraction template based on the product manual. The target network device is any network device in the network.

In a possible implementation, the generating a target extraction template based on a product manual of a target network device includes:

First step: Determine a cause description keyword in a product manual of a target network device.

Second step: Extract template content from the product manual of the target network device based on the cause description keyword.

Third step: Generate a target extraction template based on the template content.

In some examples, a cause description keyword in a product manual of a target network device may be determined through semantic analysis or manual annotation. Optionally, the cause description keyword includes at least one of a single word and a word group including at least two words. For example, the cause description keyword includes but is not limited to reason, error, because, due to, error code, because of, and the like.

For example, the second step of extracting template content from the product manual of the target network device based on the cause description keyword includes:

first, searching the product manual for each cause description keyword in a string matching manner; and then extracting the template content from the product manual based on a regular expression corresponding to the found cause description keyword. The regular expression describes a string matching pattern, which is used to obtain a substring that satisfies a condition from a string. One cause description keyword corresponds to at least one regular expression.

In this embodiment of this application, there are at least two types of regular expressions. The first type of regular expression is used to extract a fault code keyword and a fault code variable type. The second type of regular expression is used to extract a fault code and fault code description information corresponding to the fault code.

For example, the first type of regular expression includes a cause description keyword. The second type of regular expression includes a label in a file format corresponding to product documentation. For example, for product documentation in the Hypertext Markup Language (HTML) format, the second type of regular expression is used to match a line feed label in the product documentation.

In addition to the regular expressions, all other means that can extract required template content may be used to extract template content from the product manual, for example, a crawler technology. This is not limited in this application.

The following uses an example to describe a process of extracting template content.

A log of RPC_FAILED is taken as an example. This log indicates that a switch fails to call Inter-Process Communication (IPC) synchronization. In product documentation of the switch, a field of "ErrorCode=[ULONG]" in information about the log includes a specific reporting cause of the log, that is, fault cause description information. By performing regular expression matching based on the foregoing keyword of error code, it can be learned that a fault code keyword of the log is ErrorCode and a fault code variable is ULONG.

Fault codes and fault code parameter meanings (that is, fault code description information) are presented in a form of a table in the product manual. Similarly, a log of RPC_FAILED is taken as an example. In source code of product documentation in the HTML format, content between labels <table> and </table> is some content of a table, content between each pair of labels <tr> and </tr> corresponds to content of one line of the table, and content between labels <th> and </th> is content of a table header, that is, "parameter meanings", "parameter names", and the like. Content between <td> and </td> in each line of content is content of each cell of the table. Different meanings of a same fault code are usually separated by specific HTML labels such as <p> </p> or <ul> <li> </li> <ul>. By performing regular expression matching based on this, information about fault codes and fault code parameter meanings can be obtained.

Manner 2: Generate an extraction template based on received input information. The input information includes template content.

It should be noted that, that a manner of generating an extraction template includes at least one of the following manners means that the extraction template is generated in the manner 1; the extraction template is generated in the manner 2; or a part of the extraction template is generated in the manner 1 and a part of the template is generated in manner 2.

In some examples, an extraction template is generated by the cloud device and then sent to the network management device, and the network management device receives and stores the extraction template sent by the cloud device. In this case, the method further includes: The network management device sends a template obtaining request to the cloud device, where the template obtaining request includes device information of the network device; and the cloud device sends, based on the received template obtaining request, an extraction template of the network device corresponding to the device information in the template obtaining request to the network management device.

In some other examples, an extraction template may alternatively be generated by the network management device and stored in the network management device. In this way, the network management device can subsequently extract a fault code from information about an abnormal event based on the stored extraction template.

In this embodiment of this application, at least one of the first extraction result or the second extraction result includes at least one fault code. In a possible implementation, the first extraction result is empty, that is, no fault code is extracted from the information about the first abnormal event, and the second extraction result includes at least one fault code. In another possible implementation, the first extraction result includes at least one fault code, and the second extraction result is empty. In still another possible implementation, the first extraction result includes at least one fault code, and the second extraction result includes at least one fault code.

The extracting a fault code from the information about the first abnormal event based on the event identifier and the fault code keyword that are in the first extraction template, to obtain a first extraction result includes:

First, a target event identifier and a target fault code keyword in the first extraction template are determined, that is, each event identifier in the first extraction template is matched with the event identifier in the information about the first abnormal event, where an event identifier that is in the first extraction template and that is the same as the event identifier in the information about the first abnormal event is the target event identifier, and a fault code keyword that is in the first extraction template, that corresponds to the target event identifier, and that is the same as the fault code keyword in the information about the first abnormal event is the target fault code keyword; and then, regular expression matching is performed on the fault code keyword in the information about the first abnormal event based on the target fault code keyword, to extract a fault code from the information about the first abnormal event.

For example, in an extraction template, a target fault code keyword and a corresponding variable type are "ErrorCode= [ULONG]", a corresponding regular expression is Error-Code=[*], and a fault code keyword and a corresponding fault code in information about an abnormal event are recorded in a form of ErrorCode=[6]. The fault code 6 corresponding to the fault code keyword is extracted based on the regular expression.

A manner of generating the second extraction result is similar to a process of generating the first extraction result, and detailed descriptions are omitted in this embodiment of this application.

In the foregoing fourth step, after the first extraction result is determined, a fault code and a fault code keyword that are included in the first extraction result are combined, to obtain the first fault cause description information. Similarly, after the second extraction result is determined, a fault code and a fault code keyword that are included in the second extraction result are combined, to obtain the second fault cause description information.

It should be noted that when no fault code is extracted from the information about the first abnormal event, the first extraction result is empty, and the first fault cause description information is empty or the first fault cause description information is the event identifier of the first abnormal event. When no fault code is extracted from the information about the second abnormal event, the second extraction result is empty, and the second fault cause description information is empty or the second fault cause description information is the event identifier of the second abnormal event.

In some examples, 203 includes:

obtaining a first fault propagation relationship model, where the first fault propagation relationship model includes a plurality of first fault propagation relationships, and the first fault propagation relationship is used to record a fault propagation direction between two abnormal events in case of corresponding fault cause description information; and determining whether a first target fault propagation relationship exists in the first fault propagation relationship model. If the first target fault propagation relationship exists in the first fault propagation relationship model, it is determined, based on the first target fault propagation relationship, a fault propagation direction between the first abnormal event corresponding to the first fault cause description information and the second abnormal event corresponding to the second fault cause description information, where the first target fault propagation relationship is a first fault propagation relationship that includes the event identifier in the information about the first abnormal event, the event identifier in the information about the second abnormal event, the first fault cause description information, and the second fault cause description information.

In this embodiment of this application, by comparing the event identifier in the information about the first abnormal event, the event identifier in the information about the second abnormal event, the first fault cause description information, and the second fault cause description information with each first fault propagation relationship in the first fault propagation relationship model, a first fault propagation relationship including the event identifier in the information about the first abnormal event, the event identifier in the information about the second abnormal event, the first fault cause description information, and the second fault cause description information is the first target fault propagation relationship. Whether the first target fault propagation relationship exists in the first fault propagation relationship model is determined in a comparison and search manner, so that the implementation is convenient and simple.

TABLE 2

| Column names | Meaning | Example |
|---|---|---|
| model | Device model | S12700 |
| version | System software version | V200R011C10 |
| Fault code propagation relationship | Fault code propagation relationship (a plurality of), including whether to be a root cause, an order, a type: whether to be a peer end, a result event, fault cause description information corresponding to the result event, a type of an entity on which the result event is located, a cause event, fault cause description information corresponding to the cause event, and a type of an entity on which the cause event is located | { { "rc_flag":1, "num_hops":0, "type": "other", "src_event":"AP_FAULT", "src_err_code":"", "src_label": "ap", "dst_event":"AP_NORMAL_TO_FAULT", "dst_err_code": "Reason@a Command is delivered to reboot an ap", "dst_label": "ap"}, { "rc_flag":1, "num_hops":0, "type": "other", "src_event":"AP_HOT_BOOT", "src_err_code":"", "src_label": "ap", "dst_event":"AP_NORMAL_TO_FAULT", "dst_err_code": "Reason@a Command is delivered to reboot an ap", "dst_label": "ap"}, ... } |

As shown in Table 2, the first fault propagation relationship model includes a plurality of first fault propagation relationships.

In the $1^{st}$ first fault propagation relationship, the entity type "src_label" corresponding to the result event is "AP", and the entity type "dst_label" corresponding to the cause event is "AP". The event identifier "src_event" of the result event is "AP_FAULT", indicating a notification that the AP goes offline. Fault cause description information "src_err_code" corresponding to the result event is empty, indicating that the result event does not have fault cause description information. The event identifier "dst_event" of the cause event is "AP_NORMAL_TO_FAULT", indicating that the AP changes from a normal state to an abnormal state. The fault cause description information "dst_err_code" corresponding to the cause event is fault code keyword@fault code "Reason@a Command is delivered to reboot an ap", indicating that a command for rebooting the AP is delivered.

In the $2^{nd}$ first fault propagation relationship, the entity type "src_label" corresponding to the result event is "AP", and the entity type "dst_label" corresponding to the cause event is "AP". The event identifier "src_event" of the result event is "AP_HOT_BOOT", indicating an alarm that the AP is hot-booted. Fault cause description information "src_err_code" corresponding to the result event is empty, indicating that the result event does not have fault cause description information. The event identifier "dst_event" of the cause event is "AP_NORMAL_TO_FAULT", indicating that the AP changes from a normal state to an abnormal state. The fault cause description information "dst_err_code" corresponding to the cause event is fault code keyword@fault code "Reason@a Command is delivered to reboot an ap", indicating that a command for rebooting the AP is delivered.

Optionally, each first fault propagation relationship further includes association mode indication information, and the association mode indication information indicates a number of hops between two entities. When the number of hops is equal to 0, the first abnormal event and the second abnormal event are on a same entity; when the number of hops is equal to 1, the two entities are directly connected; when the number of hops is equal to 2, the two entities are indirectly connected through one entity; and the rest can be deduced by analogy. For example, in the first and $2^{nd}$ first fault propagation relationships, "num_hops": 0 indicates that the number of hops is 0. That is to say, the two abnormal events are located on a same entity.

In some examples, the first fault propagation relationship model is obtained based on historical fault cases.

For example, any first fault propagation relationship in the first fault propagation relationship model is generated in the following manner:

First step: Determine a first entity and a second entity that are mutually associated. The mutual association means that a number of hops between two entities is within a specified number of hops, for example, within 1 hop or within 2 hops.

Second step: Determine a third abnormal event on a first entity, third fault cause description information used to describe a cause of occurrence of the third abnormal event, a fourth abnormal event on a second entity, and fourth fault cause description information used to describe a cause of occurrence of the fourth abnormal event. There are one or more third abnormal events, and there are one or more fourth abnormal events.

Third step: Determine, based on expert annotation, a cause event and a result event that are in a third abnormal event corresponding to any third fault cause description information and a fourth abnormal event corresponding to any fourth fault cause description information, to obtain a first fault propagation relationship. The expert annotation is used to indicate a root cause in the third fault cause description information corresponding to the third abnormal event and the fourth fault cause description information corresponding to the fourth abnormal event.

For example, the first entity and the second entity that are mutually associated are determined by using an algorithm such as graph search or association learning. For example, a network graph is first generated based on historical fault cases, where the network graph is a relationship network formed by association relationships between entities in the network, and the network graph further includes an identifier of an abnormal event associated with each entity. Based on the network graph, the first entity and the second entity that are mutually associated, the third abnormal event on the first entity, and the fourth abnormal event on the second entity may be determined. An expert determines, based on an actual situation of the historical fault cases, a cause event in the third abnormal event and the fourth abnormal event with reference to the third fault cause description information corresponding to the third abnormal event and the fourth fault cause description information corresponding to the fourth abnormal event, and performs annotation. A first fault propagation relationship is obtained by learning, based on the annotation, a propagation relationship between the third abnormal event corresponding to the third fault cause description information and the fourth abnormal event corresponding to the fourth fault cause description information, and is added to the first fault propagation relationship model.

Figure 5:
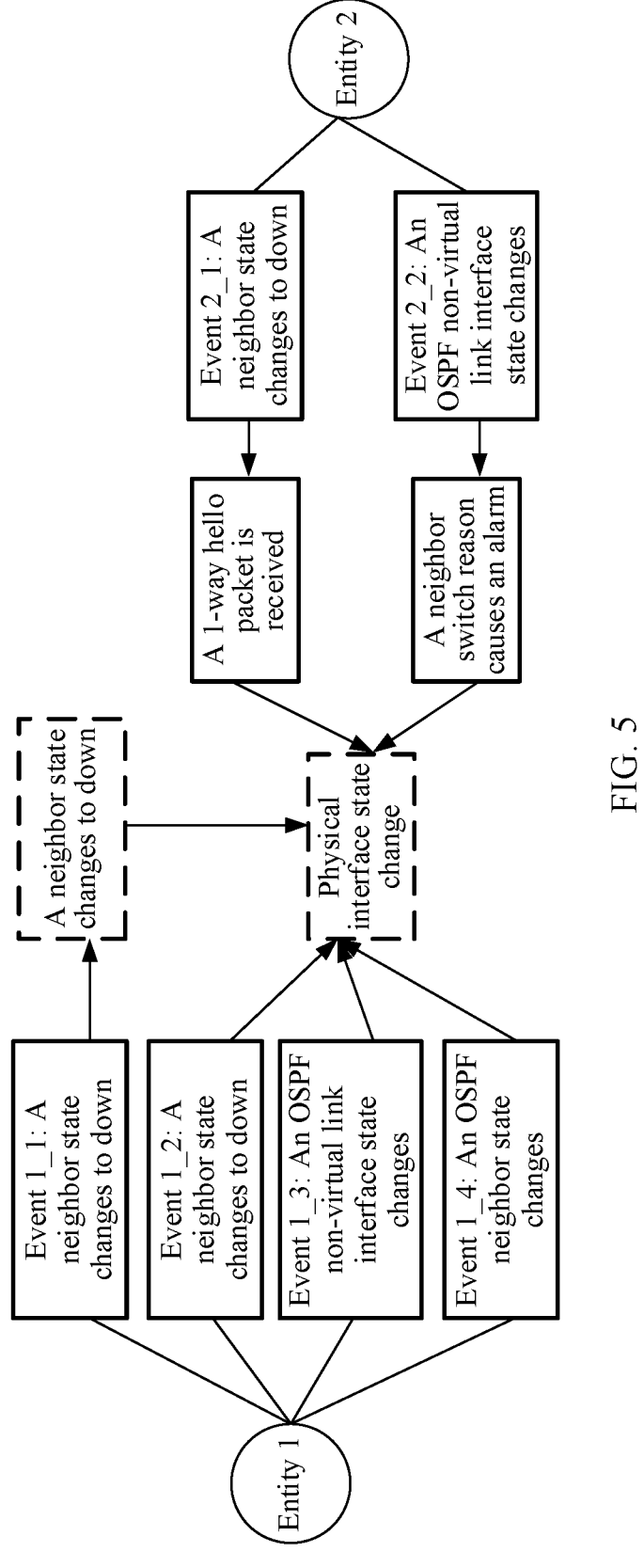
FIG. 5 is a schematic diagram of a process of generating a first fault propagation relationship model.

A process of generating a first fault propagation relationship is described below by using an example with reference to FIG. 5. As shown in FIG. 5, a fault of the Open Shortest Path First (OSPF) protocol is used as an example. The OSPF protocol between two network devices is abnormal. As shown in a network graph, two OSPF protocol entities are associated with some abnormal events. The graph search algorithm is used to obtain the abnormal events on the two entities.

The abnormal events on the left entity include: event 1_1, where a neighbor state changes to down, and an event identifier is NBR_CHG_DOWN; event 1_2, where a neighbor state changes to down, an event identifier is NBR_DOWN_REASON, and fault cause description information is physical interface state change; event 1_3, where an OSPF non-virtual link interface state changes, an event identifier is IFCHG, and fault cause description information is physical interface state change; and event 1_4, where an OSPF neighbor state changes, an event identifier is NBRCHG, and fault cause description information is physical interface state change.

The event 1_2, the event 1 3, and the event 1_4 have different event identifiers, but have the same fault cause description information, indicating that the events are triggered by a same cause. For information about an abnormal event that does not include specific fault cause description information, for example, the event 1_1, the fault cause description information of the abnormal event may be the same as the event identifier.

The abnormal events on the right entity include: event 2_1, where a neighbor state changes to down, an event identifier is NBR_DOWN_REASON, and fault cause description information is that a 1-Way Hello packet is received (1-wayhello received); and event 2_2, where an OSPF neighbor state changes, an event identifier is NBRCHG, and fault cause description information is that a neighbor switch reason causes an alarm (peer router reason).

Based on the specific situation of the fault case, the expert marks the fault cause description information of the physical interface state change as the root cause of the fault. Based on the mark of the root cause, the algorithm learns a o-order propagation relationship that physical interface state change causes occurrence of the events 1_1, 1_2, 1_3, and 1_4 on the same entity (that is, the o-order associated entity); learns a 1-order propagation relationship that between 1-order associated entities, physical interface state change on one entity causes another entity to receive the 1-Way Hello packet and then report the event 2_1; and learns a 1-order propagation relationship that between 1-order associated entities, physical interface state change on one entity causes another entity to generate an alarm caused by a neighbor switch reason and then report the event 2_2.

The fault code propagation relationships that combine the specific fault cause description information are added to a fault propagation relationship library for real-time root cause tracing.

It should be noted that the associated entities in the fault case are in a 1-hop relationship, and a method for learning a fault code propagation relationship of a multi-hop relationship is similar. Details are not described herein again.

In a possible implementation, when one abnormal event corresponds to at least two pieces of fault cause description information, one piece of main fault cause description information may be determined in a manner such as expert annotation. When network fault analysis is performed, a propagation relationship between two abnormal events is determined based on only the main fault cause description information.

Because historical fault cases are finite, and cannot include all fault cause description information of each abnormal event, a second fault propagation relationship model may be further generated based on the first fault propagation relationship model. The second fault propagation relationship model includes at least one second fault propagation relationship, each second fault propagation relationship is used to record a possible fault propagation direction between two abnormal events in case of corresponding fault cause description information.

TABLE 3

| Column names | Meaning | Example |
|---|---|---|
| model | Device model | S12700 |
| version | System software version | V200R011C10 |
| Fault code possible propagation relationship | Fault code probability propagation relationship (a plurality of), including whether to be a root cause, an order, a type: whether to be a peer end, a probability, a result event, fault cause description information corresponding to the result event, a type of an entity on which the result event is located, a cause event, fault cause description information corresponding to the cause event, and a type of an entity on which the cause event is located | { { "rc_flag":1, "num_hops":1, "type": "other", "probability": 0.8, "src_event":"AP_FAULT", "src_err_code":"", "src_label": "interface", "dst_event":"AP_NORMAL_TO_FAULT", "dst_err_code": "Reason@The ap restarts due to a chip exception", "dst_label": "ap"}, { "rc_flag":1, "num_hops":,1, "type": "other", "probability": 0.6, "src_event": "AP_WORK_MODE_CHANGE", "src_err_code":"", "src_label": "interface", "dst_event":"AP_NORMAL_TO_FAULT", "dst_err_code": "Reason@The ap restarts due to a chip exception", "dst_label": "ap"}, ... } |

As shown in Table 3, the second fault propagation relationship model includes a plurality of second fault propagation relationships. The following uses the first and $2^{nd}$ second fault propagation relationships as an example for description.

In the $1^{st}$ second fault propagation relationship, the entity type "src_label" corresponding to the result event is "interface", and the entity type "dst_label" corresponding to the cause event is "AP". The event identifier "src_event" of the result event is "AP_FAULT", indicating a notification that the AP goes offline. Fault cause description information "src_err_code" corresponding to the result event is empty "", indicating that the result event does not have fault cause description information. The event identifier "dst_event" of the cause event is "AP_NORMAL_TO_FAULT", indicating that the AP changes from a normal state to an abnormal state. The fault cause description information "dst_err_code" corresponding to the cause event is fault code keyword@fault code "Reason@The ap restarts due to a chip exception", indicating that the AP restarts due to a chip exception.

In the $2^{nd}$ second fault propagation relationship, the entity type "src_label" corresponding to the result event is "interface", and the entity type "dst_label" corresponding to the cause event is "AP". The event identifier "src_event" of the result event is "AP_WORK_MODE_CHANGE", indicating an alarm that the working mode of the AP changes. Fault cause description information "src_err_code" corresponding to the result event is empty "", indicating that the result event does not have fault cause description information. The event identifier "dst_event" of the cause event is "AP_NORMAL_TO_FAULT", indicating that the AP changes from a normal state to an abnormal state. The fault cause description information "dst_err_code" corresponding to the cause event is fault code keyword@fault code "Reason@The ap restarts due to a chip exception", indicating that the AP restarts due to a chip exception.

Optionally, the second fault propagation relationship further includes probability information, for example, a "probability" field, used to indicate a possibility that a propagation relationship between two abnormal events is established. For example, in the $1^{st}$ second fault propagation relationship, a probability that a propagation relationship between a cause event and a result event is established is 0.8; and in the $2^{nd}$ second fault propagation relationship, a probability that a propagation relationship between a cause event and a result event is established is 0.6.

When the propagation relationship between the first abnormal event and the second abnormal event cannot be determined based on the first fault propagation model, that is, the first target fault propagation relationship does not exist in the first fault propagation relationship model, 204 includes: obtaining a second fault propagation relationship model; and in response to determining that a second target fault propagation relationship exists in the second fault propagation relationship model, determining, based on the second target fault propagation relationship, a possible fault propagation direction between the first abnormal event and the second abnormal event, where the second target fault propagation relationship is a second fault propagation relationship that includes the event identifier in the information about the first abnormal event, the event identifier in the information about the second abnormal event, the first fault cause description information, and the second fault cause description information.

For example, a second fault propagation relationship in the second fault propagation relationship model is generated in the following manner:

For the unknown fault cause description information that exists in the extraction template but does not exist in the first fault propagation relationship model, a possible fault propagation relationship between two abnormal events in case of corresponding fault cause description information is determined based on the first fault propagation relationship model, and a probability that the possible fault propagation relationship is established is calculated.

Second fault propagation relationships are classified into three cases. The first case is a second fault propagation relationship that is based on the unknown fault cause description information corresponding to the fifth abnormal event and the unknown fault cause description information corresponding to the sixth abnormal event; the second case is a second fault propagation relationship that is based on the unknown fault cause description information corresponding to the fifth abnormal event and the known fault cause description information corresponding to the sixth abnormal event; and the third case is a second fault propagation relationship that is based on the known fault cause description information corresponding to the fifth abnormal event and the unknown fault cause description information corresponding to the sixth abnormal event.

For the first case, a probability that a possible fault propagation relationship between the fifth abnormal event and the sixth abnormal event is established is calculated in the following manner:

first, calculating a first similarity between the unknown fault cause description information corresponding to the fifth abnormal event and each piece of known fault cause description information of the fifth abnormal event, to obtain a first similarity set; calculating a second similarity between the unknown fault cause description information corresponding to the sixth abnormal event and each piece of known fault cause description information of the sixth abnormal event, to obtain a second similarity set; and then determining, based on the first similarity set and the second similarity set, a probability that a second fault propagation relationship between the fifth abnormal event and the sixth abnormal event is established, where the probability is also referred to as a fault propagation probability.

The probability that the second fault propagation relationship is established includes at least one of a first probability and a second probability, where the first probability is a probability that the fifth abnormal event causes the sixth abnormal event, and the second probability is a probability that the sixth abnormal event causes the fifth abnormal event.

In some examples, a first similarity greater than a first similarity threshold exists in the first similarity set, and a second similarity greater than a second similarity threshold exists in the second similarity set. The first probability is calculated based on the first similarity greater than the first similarity threshold in the first similarity set and the second similarity greater than the second similarity threshold in the second similarity set. A process of calculating the first probability is as follows:

determining first fault propagation relationships between the fifth abnormal event associated with known fault cause description information corresponding to first similarities greater than the first similarity threshold and the sixth abnormal event associated with known fault cause description information corresponding to second similarities greater than the second similarity threshold, to obtain a first relationship set;

determining, based on first similarities and second similarities that correspond to the first fault propagation relationships in the first relationship set, first weights corresponding to the first fault propagation relationships in the first relationship set, for example, using a product of the first similarity and the second similarity as a first weight of a corresponding first fault propagation relationship;

determining, based on first similarities and second similarities that correspond to first fault propagation relationships that are in the first relationship set and that indicate that the fifth abnormal event causes the sixth abnormal event, second weights corresponding to the first fault propagation relationships that are in the first relationship set and that indicate that the fifth abnormal event causes the sixth abnormal event, for example, using a product of the first similarity and the second similarity as a second weight of a corresponding first fault propagation relationship; and calculating the first probability based on a sum of the first weights corresponding to the first fault propagation relationships in the first relationship set and a sum of the second weights corresponding to the first fault propagation relationships in the first relationship set, for example, using a ratio of the sum of the second weights to the sum of the first weights as the first probability.

In some examples, the first similarity threshold is equal to the second similarity threshold. In some other examples, the first similarity threshold is not equal to the second similarity threshold.

A manner of calculating the second probability is the same as a manner of calculating the first probability, and detailed descriptions are omitted herein.

For example, the first probability is calculated by using Formula (1):

$$P(A|a? -> B|b?) = \frac{\sum_{j=1}^{m1} w_{A \to Bj}}{\sum_{i=1}^{m} w_i} \qquad (1)$$

In Formula (1), A represents the fifth abnormal event, and a? represents the unknown fault cause description information corresponding to the fifth abnormal event, B represents the sixth abnormal event, b? represents the unknown fault cause description information corresponding to the sixth abnormal event, and P(A|a?->B|b?) is a fault propagation probability that the fifth abnormal event causes the sixth abnormal event and that is based on the unknown fault cause description information corresponding to the fifth abnormal event and the unknown fault cause description information corresponding to the sixth abnormal event. wi represents a first weight of an $i^{th}$ first fault propagation relationship, m represents a total quantity of first fault propagation relationships, and m1 represents a quantity of first fault propagation relationships indicating that the fifth abnormal event causes the sixth abnormal event. A-Bj represents a $j^{th}$ first fault propagation relationship indicating that the fifth abnormal event causes the sixth abnormal event. $W_{A-Bj}$ represents a second weight corresponding to the $j^{th}$ first fault propagation relationship indicating that the fifth abnormal event causes the sixth abnormal event.

The second probability is calculated by using Formula (2):

$$P(B|b? -> A|a?) = \frac{\sum_{j=1}^{m2} w_{B \to Aj}}{\sum_{i=1}^{m} w_i} \qquad (2)$$

In Formula (2), A represents the fifth abnormal event, and a? represents the unknown fault cause description information corresponding to the fifth abnormal event, B represents the sixth abnormal event, b? represents the unknown fault cause description information corresponding to the sixth abnormal event, and P(B|b ?->A|a?) is a fault propagation probability that the sixth abnormal event causes the fifth abnormal event and that is based on the unknown fault cause description information corresponding to the fifth abnormal event and the unknown fault cause description information corresponding to the sixth abnormal event. wi represents a first weight of an $i^{th}$ first fault propagation relationship, m represents a total quantity of first fault propagation relationships, and m2 represents a quantity of first fault propagation relationships indicating that the sixth abnormal event causes the fifth abnormal event. B-Aj represents a $j^{th}$ first fault propagation relationship indicating that the sixth abnormal event causes the fifth abnormal event. $W_{B-Aj}$ represents a fifth weight corresponding to the $j^{th}$ first fault propagation relationship indicating that the sixth abnormal event causes the fifth abnormal event.

For the second case, a probability that a possible fault propagation relationship between the fifth abnormal event and the sixth abnormal event is established is calculated in the following manner:

first, calculating a first similarity between the unknown fault cause description information of the fifth abnormal event and each piece of known fault cause description information of the fifth abnormal event, to obtain a first similarity set; and then determining, based on the first similarity set, a probability that a second fault propagation relationship that is between the fifth abnormal event and the sixth abnormal event and that is based on the unknown fault cause description information of the fifth abnormal event and the known fault cause description information of the sixth abnormal event is established.

In some examples, the determining, based on the first similarity set, a probability that a second fault propagation relationship that is between the fifth abnormal event and the sixth abnormal event and that is based on the unknown fault cause description information of the fifth abnormal event and the known fault cause description information of the sixth abnormal event is established includes: calculating at least one of a first probability and a second probability based on a first similarity greater than a first similarity threshold in the first similarity set.

The calculating a first probability based on a first similarity greater than a first similarity threshold in the first similarity set includes:

determining first fault propagation relationships associated with known fault cause description information of the fifth abnormal event corresponding to first similarities greater than the first similarity threshold and known fault cause description information of the sixth abnormal event, to obtain a second relationship set;

determining, based on first similarities that correspond to the first fault propagation relationships in the second relationship set, a first weight corresponding to each first fault propagation relationship in the second relationship set, for example, using the first similarity as a first weight of a corresponding first fault propagation relationship;

determining, based on first similarities that correspond to first fault propagation relationships that are in the second relationship set and that indicate that the fifth abnormal event causes the sixth abnormal event, second weights corresponding to the first fault propagation relationships that are in the second relationship set and that indicate that the fifth abnormal event causes the sixth abnormal event, for example, using the first similarity as a corresponding second weight; and calculating the first similarity based on a sum of the first weights corresponding to the first fault propagation relationships in the second relationship set and a sum of the second weights corresponding to the first fault propagation relationships in the second relationship set, for example, using a ratio of the sum of the second weights to the sum of the first weights as the first probability.

For example, the first probability and the second probability are calculated respectively by using Formulas (3) and (4):

$$P(A\text{->}B)=w1/(w1+w2+w3) \qquad (3)$$

P(A->B) represents the first probability, w1 represents, in the second relationship set, a second weight corresponding to the first fault propagation relationship indicating that the fifth abnormal event causes occurrence of the sixth abnormal event, and w1+w2+w3 represents a sum of first weights corresponding to the first fault propagation relationships in the second relationship set.

$$P(B\text{->}A)=(w2+w3)/(w1+w2+w3) \qquad (4)$$

P(B->A) represents the second probability, w2+w3 represents, in the second relationship set, a second weight corresponding to the first fault propagation relationship indicating that the sixth abnormal event causes occurrence of the fifth abnormal event, and w1+w2+w3 represents a sum of first weights corresponding to the first fault propagation relationships in the second relationship set.

For the third case, a probability that a possible fault propagation relationship between the fifth abnormal event and the sixth abnormal event is established is calculated in the following manner:

first, calculating a similarity between the unknown fault cause description information corresponding to the sixth abnormal event and each piece of known fault cause description information of the sixth abnormal event, to obtain a second similarity set; and then determining, based on the second similarity set, a fault propagation probability between the fifth abnormal event and the sixth abnormal event.

For a related process, refer to the foregoing second case, and detailed descriptions are omitted herein.

In some other examples, the determining, based on the first similarity set, a fault propagation probability between the fifth abnormal event and the sixth abnormal event includes:

if none of first similarities in the first similarity set is greater than the first similarity threshold, calculating, based on the quantity of the first fault propagation relationships between the fifth abnormal event and the sixth abnormal event, a fault propagation probability that is between the fifth abnormal event and the sixth abnormal event and that is based on the unknown fault cause description information corresponding to the fifth abnormal event and the known fault cause description information (or the unknown fault cause description information) of the sixth abnormal event.

Similarly, the fault propagation probability between the fifth abnormal event and the sixth abnormal event includes the first probability that the fifth abnormal event causes the sixth abnormal event and the second probability that the sixth abnormal event causes the fifth abnormal event.

For example, the first probability is calculated by using Formula (5), and the second probability is calculated by using Formula (6).

$$P(A\text{->}B)=P1/P0 \qquad (5)$$

P(A->B) represents the first probability, Po represents a quantity of first fault propagation relationships between the fifth abnormal event and the sixth abnormal event, and P1 represents a quantity of first fault propagation relationships that are in the first fault propagation relationships between the fifth abnormal event and the sixth abnormal event and that indicate that the fifth abnormal event causes occurrence of the sixth abnormal event.

$$P(B\text{->}A)=P2/P0 \qquad (6)$$

P(B->A) represents the second probability, P0 represents a quantity of first fault propagation relationships between the fifth abnormal event and the sixth abnormal event, and P2 represents a quantity of first fault propagation relationships that are in the first fault propagation relationships between the fifth abnormal event and the sixth abnormal event and that indicate that the sixth abnormal event causes occurrence of the fifth abnormal event.

In still some other examples, the determining, based on the first similarity set, a fault propagation probability between the fifth abnormal event and the sixth abnormal event includes: if the first similarity set includes no first similarity greater than the first similarity threshold, but the second similarity set includes a second similarity greater than the second similarity threshold, calculating, based on the quantity of the first fault propagation relationships that are between the fifth abnormal event and the sixth abnormal event and that are associated with the second similarity greater than the second similarity threshold, a fault propagation probability that is between the fifth abnormal event and the sixth abnormal event and that is based on the unknown fault cause description information corresponding to the fifth abnormal event and the unknown fault cause description information of the sixth abnormal event. For a calculation manner, refer to related content of Formulas (5) and (6), and detailed descriptions are omitted herein.

In this embodiment of this application, when a fault code in fault cause description information is in a string format, a similarity between the unknown fault cause description information and the known fault cause description information is a similarity between fault codes in the string format. When a fault code in fault cause description information is in a non-string format, for example, a long integer format, a similarity between the unknown fault cause description information and the known fault cause description information is a similarity between pieces of fault code description information corresponding to fault codes. The fault code description information corresponding to the fault code may be determined by using the foregoing extraction template.

In this embodiment of this application, a manner of calculating a similarity is not limited, and includes but is not limited to a natural language processing method such as sentence similarity calculation.

Figure 6:
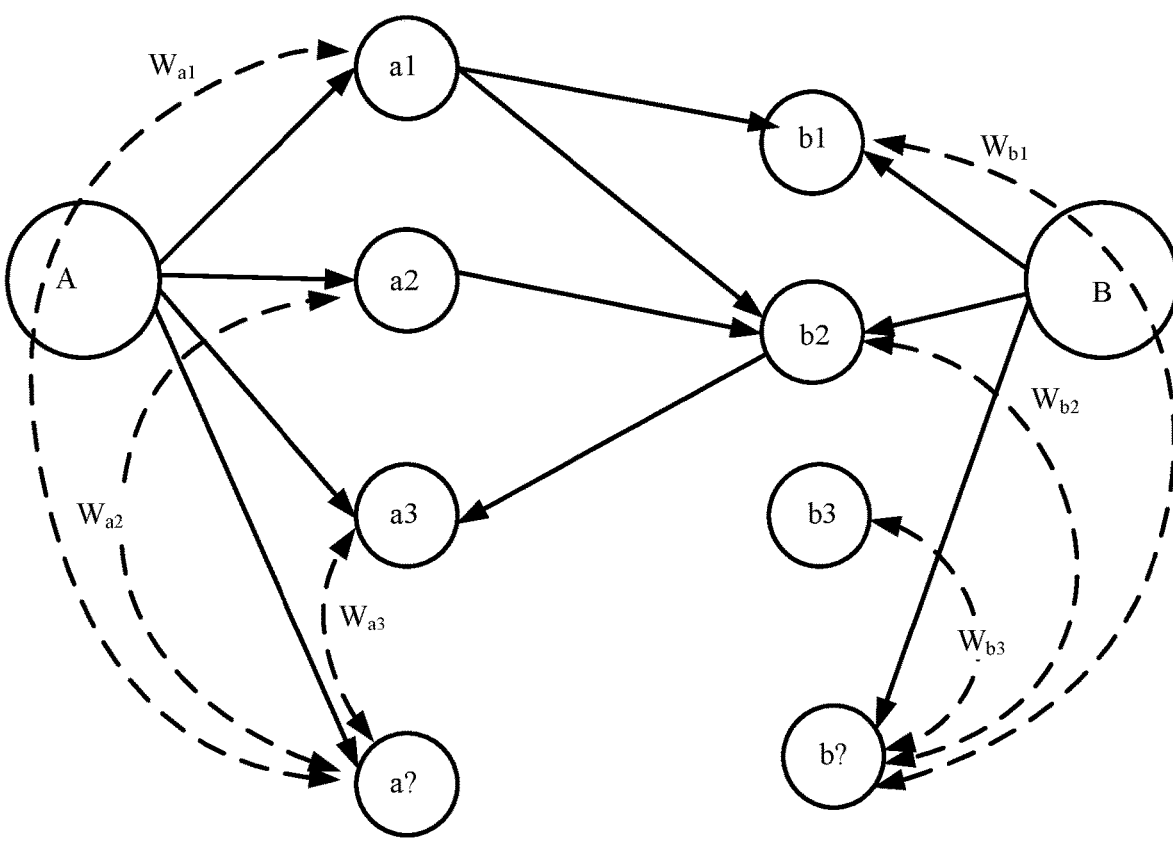
FIG. 6 is a schematic diagram of a process of generating a second fault propagation relationship model.

A process of generating a second fault propagation relationship is described below by using an example with reference to FIG. 6. As shown in FIG. 6, it is assumed that in a first fault propagation relationship model, four first fault propagation relationships exist between an abnormal event A and an abnormal event B. In the first to the $3^{rd}$ first fault propagation relationships, the abnormal event A is a result event, and the abnormal event B is a cause event. In the $4^{th}$ first fault propagation relationship, the abnormal event B is a result event, and the abnormal event A is a cause event. In the four first fault propagation relationships, pieces of fault cause description information corresponding to the abnormal event A are a1, a2, and a3, and pieces of fault cause description information corresponding to the abnormal event B are b1, b2, and b3.

If an extraction template corresponding to the abnormal event A further includes fault cause description information a?, a similarity between a? and each of a1, a2, and a3 is calculated, and first similarities obtained through calculation are respectively wa1, wa2, and wa3. If an extraction template corresponding to the abnormal event B further includes fault cause description information b?, a similarity between b? and each of b1, b2, and b3 is calculated, and second similarities obtained through calculation are respectively wb1, wb2, and wb3.

Each of the first similarities and the second similarities is compared with a similarity threshold. If none of the first similarities and the second similarities is less than the similarity threshold, a product of a first similarity and a second similarity corresponding to a first fault propagation relationship is used as a first weight of the first fault propagation relationship. In this case, a first weight w1

If no similarity not less than the similarity threshold exists in the first similarities and the second similarities, the first probability and the second probability are calculated based on a quantity of first fault propagation relationships corresponding to that the abnormal event A is a result event and the abnormal event B is a cause event, and a quantity of first fault propagation relationships corresponding to that the abnormal event B is a result event and the abnormal event A is a cause event.

Optionally, after a possible fault propagation relationship between the first abnormal event and the second abnormal event is determined based on a second fault propagation relationship model, the possible fault propagation relationship further needs to be checked, that is, a second target fault propagation relationship is checked.

In some examples, the check is implemented by a cloud device. The second target fault propagation relationship is sent by a network management device to the cloud device, and provided by the cloud device to an expert for check, to obtain the checked second target fault propagation relationship. In a possible implementation, if the expert confirms that the second target fault propagation relationship is correct, the second target fault propagation relationship is the checked second target fault propagation relationship. In another possible implementation, the second target fault propagation relationship is checked unsuccessfully, and the second target fault propagation relationship is corrected based on a correction instruction of the expert, where the corrected second target fault propagation relationship is the checked second target fault propagation relationship.

TABLE 4

| Column names | Meaning | Example |
|---|---|---|
| model | Device model | S12700 |
| version | System software version | V200R011C10 |
| Candidate fault code propagation relationship | Newly obtained unknown fault codes propagation relationship (single) | { "status": to be confirmed, "rc_flag":1, "num_hops":0, "type": "other", "src_event":"AP_FAULT", "src_err_code":"", "src_label": "ap", "dst_event": "AP_NORMAL_TO_FAULT", "dst_err_code": "Reason@The ap restarts due to a chip exception", "dst_label": "ap"} | corresponding to the $1^{st}$ first fault propagation relationship is equal to wa1*wb1, a first weight w2 corresponding to the $2^{nd}$ first fault propagation relationship is equal to wa1*wb2, a first weight w3 corresponding to the $3^{rd}$ first fault propagation relationship is equal to wa2*wb2, and a first weight w4 corresponding to the $4^{th}$ first fault propagation relationship is equal to wa3*wb2.

Second weights corresponding to the first fault propagation relationships corresponding to that the abnormal event A is a result event and the abnormal event B is a cause event are respectively w1, w2, and w3, and a first probability is equal to (w1+w2+w3)/(w1+w2+w3+w4). A second weight corresponding to the first fault propagation relationship corresponding to that the abnormal event B is a result event and the abnormal event A is a cause event is w4, and a second probability is equal to w4/(w1+w2+w3+w4).

If both a similarity not less than the similarity threshold and a similarity less than the similarity threshold exist in the first similarities and the second similarities, a weight corresponding to the similarity less than the similarity threshold needs to be removed from the formula.

Optionally, the method further includes: updating the first fault propagation relationship model and the second fault propagation relationship model based on the checked second target fault propagation relationship.

The updating the first fault propagation relationship model includes: adding the checked second target fault propagation relationship as a new first fault propagation relationship to the first fault propagation relationship model.

The updating the second fault propagation relationship model includes: recalculating second fault propagation relationships in the second fault propagation relationship model based on the updated first fault propagation relationship model. For a calculation manner, refer to the foregoing related content of generating second fault propagation relationships in the second fault propagation relationship model. Detailed descriptions are omitted herein. A larger quantity of first fault propagation relationships in the first fault propagation relationship model indicates higher accuracy of calculated second fault propagation relationships, which facilitates accuracy of a possible fault propagation relationship subsequently determined by using the second fault propagation relationship model.

In this embodiment of this application, the first fault propagation relationship model and the second fault propagation relationship model are updated by the cloud device. After updating the first fault propagation relationship model and the second fault propagation relationship model, the cloud device sends the updated first fault propagation relationship model and the updated second fault propagation relationship model to the network management device, so that the network management device subsequently determines a propagation relationship between abnormal events based on the new first fault propagation relationship model and the new second fault propagation relationship model.

Figure 7:
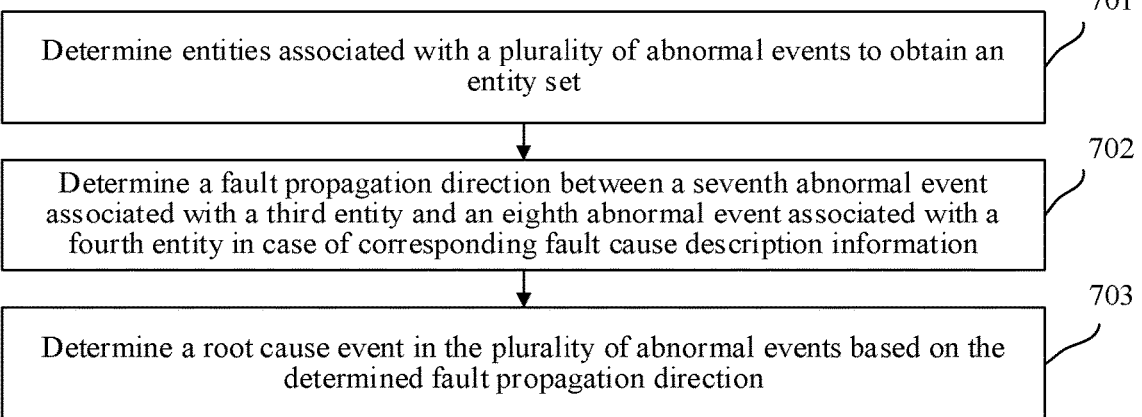
FIG. 7 is a flowchart of another network fault analysis method according to an example embodiment of this application.

When a fault occurs at a location in a network, an exception usually occurs at another location, and consequently, a plurality of network devices report information about a plurality of abnormal events. Therefore, this application further provides a network fault analysis method, to determine a root cause event in a plurality of abnormal events, and determine a root cause entity corresponding to the root cause event, so as to locate a network fault. FIG. 7 is a flowchart of another network fault analysis method according to an example embodiment of this application. As shown in FIG. 7, the method includes the following several processes.

701: Determine entities associated with a plurality of abnormal events to obtain an entity set.

When information about the plurality of abnormal events is received, the entities associated with the plurality of abnormal events are determined. For related content of the information about the plurality of abnormal events and a manner of determining the entities associated with the abnormal events, refer to 201. Detailed descriptions are omitted herein.

The plurality of abnormal events are associated with a plurality of entities, and each entity is associated with at least one abnormal event.

Any entity in the entity set has at least one associated entity belonging to the entity set. In this embodiment of this application, an associated entity refers to an entity whose number of hops between the associated entity and a corresponding entity is within a specified number of hops. For example, if the specified number of hops is 2, the number of hops between the associated entity and the corresponding entity is 0, 1, or 2.

In this embodiment of this application, a type of an entity includes but is not limited to an interface, a component, a protocol, a service, and the like. One network device may correspond to a plurality of entities.

702: Determine a fault propagation direction between a seventh abnormal event associated with a third entity and an eighth abnormal event associated with a fourth entity in case of corresponding fault cause description information.

The third entity and the fourth entity are any two mutually associated entities in the entity set. The seventh abnormal event is any one of at least one abnormal event associated with the third entity. The eighth abnormal event is any one of at least one abnormal event associated with the fourth entity.

Fault cause description information corresponding to the seventh abnormal event is seventh fault cause description information. Fault cause description information corresponding to the eighth abnormal event is eighth fault cause description information. The fault propagation direction is used to indicate a cause event and a result event that are in the seventh abnormal event corresponding to the seventh fault cause description information and the eighth abnormal event corresponding to the eighth fault cause description information.

As described above, each abnormal event corresponds to one event identifier and one piece of fault cause description information. In some examples, abnormal events with different event identifiers correspond to same fault cause description information. For example, event identifiers of the seventh abnormal event and the eighth abnormal event are different, but the seventh fault cause description information is the same as the eighth fault cause description information. In some other examples, abnormal events with different event identifiers correspond to different fault cause description information. For example, event identifiers of the seventh abnormal event and the eighth abnormal event are different, and the seventh fault cause description information is also different from the eighth fault cause description information. In still some other examples, abnormal events with a same event identifier correspond to different fault cause description information. For example, event identifiers of the seventh abnormal event and the eighth abnormal event are the same, and the seventh fault cause description information is also different from the eighth fault cause description information.

A fault propagation direction between any two abnormal events in case of corresponding fault cause description information in 702 is determined in the manner of determining the fault propagation direction between the first abnormal event corresponding to the first fault cause description information and the second abnormal event corresponding to the second fault cause description information in the related embodiment in FIG. 2.

In some examples, all fault propagation directions are determined by using the first fault propagation relationship model. In some other examples, some fault propagation directions are determined by using the first fault propagation relationship model, and some other fault propagation directions are determined by using the second fault propagation relationship model.

In some examples, a fault propagation direction between two abnormal events associated on an associated entity pair in case of corresponding fault cause description information is determined in ascending order of numbers of hops between associated entity pairs. For example, a fault propagation direction between two abnormal events on an associated entity pair with a number of hops of 0 (that is, a same entity) in case of corresponding fault cause description information is first determined. Then, a fault propagation direction between two abnormal events on an associated entity pair with a number of hops of 1 in case of corresponding fault cause description information is first determined. The rest can be deduced by analogy, until fault propagation directions between abnormal events on all associated entity pairs in case of corresponding fault cause description information are determined.

703: Determine a root cause event in the plurality of abnormal events based on the determined fault propagation direction.

For example, 703 includes the following two steps.

First step: Determine a reference value of each abnormal event based on the determined fault propagation direction.

The reference value is a sum of weights of fault propagation directions in which the abnormal event is used as a result event. The weight of the fault propagation direction is used to indicate a probability that a corresponding fault propagation direction is true. In this embodiment of this application, when a fault propagation direction is determined based on the first fault propagation relationship model, a weight of the fault propagation direction is 1. When a fault propagation direction is determined based on the second fault propagation relationship model, a weight of the fault propagation direction is a probability corresponding to a corresponding second fault propagation relationship.

Second step: Determine the root cause event in the plurality of abnormal events based on the reference values of the abnormal events.

In this embodiment of this application, an abnormal event with a minimum reference value is determined as the root cause event in the plurality of abnormal events. The minimum reference value indicates that no other abnormal event causes the occurrence of the abnormal event with the minimum reference value.

In this embodiment of this application, there are one or more determined root cause events. For example, a same cause triggers the network device to report a plurality of abnormal events (carrying different fault cause description information) associated with a same entity, and the plurality of abnormal events are all root cause events.

In this embodiment of this application, an entity associated with a root cause event is a root cause entity. After the root cause event and the root cause entity are determined, prompt information can be used to notify a skilled person of a fault analysis result, to make it convenient for the skilled person to rectify a fault.

Figure 8:
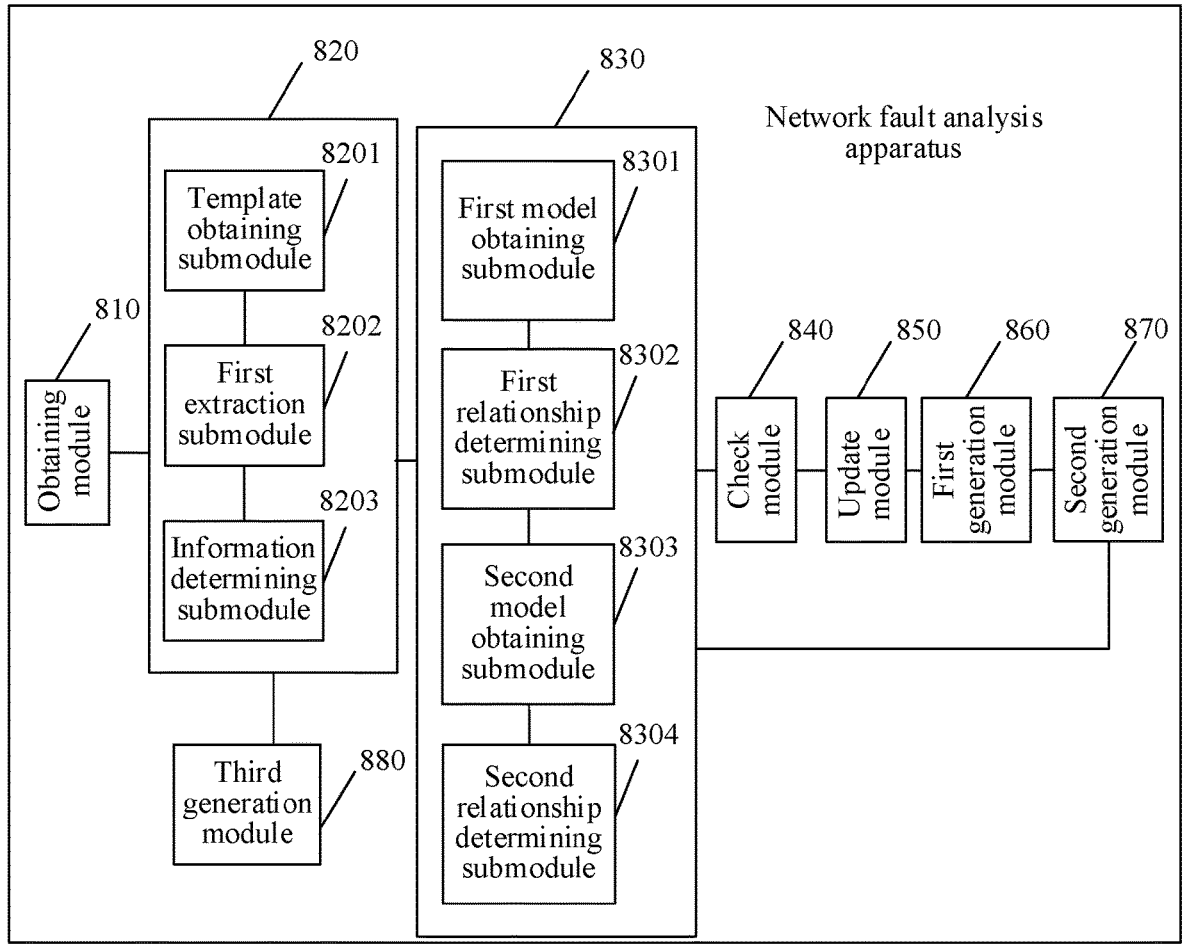
FIG. 8 is a schematic diagram of a structure of a network fault analysis apparatus according to an example embodiment of this application.

FIG. 8 is a diagram of a structure of a network fault analysis apparatus according to an embodiment of this application. The apparatus may be implemented as a part of the apparatus or the entire apparatus by using software, hardware, or a combination thereof. The apparatus provided in this embodiment of this application can implement the process in FIG. 2 in embodiments of this application. As shown in FIG. 8, the apparatus includes: an obtaining module 810, a first determining module 820, and a second determining module 830.

The obtaining module 810 is configured to obtain information about a first abnormal event and information about a second abnormal event. The first determining module 820 is configured to: determine first fault cause description information based on the information about the first abnormal event obtained by the obtaining module 810, and determine second fault cause description information based on the information about the second abnormal event obtained by the obtaining module 810, where the first fault cause description information is used to describe a cause of occurrence of the first abnormal event, and the second fault cause description information is used to describe a cause of occurrence of the second abnormal event. The second determining module 830 is configured to determine, based on an event identifier in the information about the first abnormal event, an event identifier in the information about the second abnormal event, the first fault cause description information, and the second fault cause description information, a fault propagation direction between the first abnormal event corresponding to the first fault cause description information and the second abnormal event corresponding to the second fault cause description information.

In a possible implementation, the first determining module 820 includes: a template obtaining submodule 8201, an extraction submodule 8202, and an information determining submodule 8203. The template obtaining submodule 8201 is configured to obtain a first extraction template of a first network device and a second extraction template of a second network device, where the first network device is a network device that sends the information about the first abnormal event, the second network device is a network device that sends the information about the second abnormal event, and each of the first extraction template and the second extraction template includes an event identifier and a fault code keyword. The extraction submodule 8202 is configured to: extract a fault code from the information about the first abnormal event based on the same event identifier and fault code keyword that are in the first extraction template and the information about the first abnormal event, to obtain a first extraction result; and extract a fault code from the information about the second abnormal event based on the same event identifier and fault code keyword that are in the second extraction template and the information about the second abnormal event, to obtain a second extraction result. The information determining submodule 8203 is configured to: determine the first fault cause description information based on the first extraction result, and determine the second fault cause description information based on the second extraction result.

In a possible implementation, at least one of the first extraction result or the second extraction result includes at least one fault code, and the information determining submodule 8204 is configured to combine a fault code included in the first extraction result and the second extraction result and a corresponding fault code keyword, where each combination is one piece of fault cause description information, so as to obtain at least one piece of fault cause description information.

In a possible implementation, the second determining module 830 includes: a first model obtaining submodule 8301 and a first relationship determining submodule 8302. The first model obtaining submodule 8301 is configured to obtain a first fault propagation relationship model, where the first fault propagation relationship model includes a plurality of first fault propagation relationships, and the first fault propagation relationship is used to record a fault propagation direction between two abnormal events in case of corresponding fault cause description information. The first relationship determining submodule 8302 is configured to: in response to determining that a first target fault propagation relationship exists in the first fault propagation relationship model, determine, based on the first target fault propagation relationship, the fault propagation direction between the first abnormal event corresponding to the first fault cause description information and the second abnormal event corresponding to the second fault cause description information, where the first target fault propagation relationship is a first fault propagation relationship that includes the event identifier in the information about the first abnormal event, the event identifier in the information about the second abnormal event, the first fault cause description information, and the second fault cause description information.

In another possible implementation, the second determining module 830 includes: a first model obtaining submodule 8301, a second model obtaining submodule 8303, and a second relationship determining submodule 8304. The first model obtaining submodule 8301 is configured to obtain a first fault propagation relationship model, where the first fault propagation relationship model includes a plurality of first fault propagation relationships, and the first fault propagation relationship is used to record a fault propagation direction between two abnormal events in case of corresponding fault cause description information. The second model obtaining submodule 8303 is configured to: in response to determining that a first target fault propagation relationship does not exist in the first fault propagation relationship model, obtain a second fault propagation relationship model, where the first target fault propagation relationship is a first fault propagation relationship that includes the event identifier in the information about the first abnormal event, the event identifier in the information about the second abnormal event, the first fault cause description information, and the second fault cause description information, the second fault propagation relationship model includes a plurality of second fault propagation relationships, the second fault propagation relationship is used to record a possible fault propagation direction between two abnormal events in case of corresponding fault cause description information, and the second fault propagation relationship model is generated based on the first fault propagation relationship model. The second relationship determining submodule 8304 is configured to: in response to determining that a second target fault propagation relationship exists in the second fault propagation relationship model, determine, based on the second target fault propagation relationship, the fault propagation direction between the first abnormal event corresponding to the first fault cause description information and the second abnormal event corresponding to the second fault cause description information, where the second target fault propagation relationship is a second fault propagation relationship that includes the event identifier in the information about the first abnormal event, the event identifier in the information about the second abnormal event, the first fault cause description information, and the second fault cause description information.

Optionally, the apparatus further includes: a check module 840 and an update module 850. The check module 840 is configured to check the second target fault propagation relationship after the second relationship determining submodule 8304 determines, based on the second target fault propagation relationship, the fault propagation direction between the first abnormal event corresponding to the first fault cause description information and the second abnormal event corresponding to the second fault cause description information. The update module 850 is configured to update the first fault propagation relationship model and the second fault propagation relationship model based on the checked second target fault propagation relationship.

Optionally, the apparatus further includes a first generation module 860. The first generation module 860 is configured to generate a first fault propagation relationship in the first fault propagation relationship model in the following manner: determining a third abnormal event on a first entity, third fault cause description information used to describe a cause of occurrence of the third abnormal event, a fourth abnormal event on a second entity, and fourth fault cause description information used to describe a cause of occurrence of the fourth abnormal event, where the first entity and the second entity are mutually associated; and determining, based on expert annotation, a cause event and a result event that are in the third abnormal event corresponding to the third fault cause description information and the fourth abnormal event corresponding to the fourth fault cause description information, to obtain the first fault propagation relationship.

Optionally, the apparatus further includes a second generation module 870. The second generation module 870 is configured to generate a second fault propagation relationship in the second fault propagation relationship model in the following manner: determining a fifth abnormal event with unknown fault cause description information, where the unknown fault cause description information is fault cause description information of a corresponding abnormal event other than known fault cause description information, and the known fault cause description information is fault cause description information in a first fault propagation relationship associated with the corresponding abnormal event; calculating a first similarity between the unknown fault cause description information of the fifth abnormal event and each piece of known fault cause description information of the fifth abnormal event, to obtain a first similarity set; and determining, based on the first similarity set, a probability that a second fault propagation relationship corresponding to the fifth abnormal event in case of the unknown fault cause description information is established. For detailed content, refer to the foregoing descriptions. Detailed descriptions are omitted herein.

Optionally, the apparatus further includes: a third generation module 880, configured to: determine a cause description keyword in a product manual of a target network device; extract template content from the product manual of the target network device based on the cause description keyword; and generate a target extraction template based on the template content, where the target network device is the first network device, and the target extraction template is the first extraction template; or the target network device is the second network device, and the target extraction template is the second extraction template.

In this embodiment of this application, the first fault cause description information used to describe the cause of occurrence of the first abnormal event is determined based on the information about the first abnormal event, and the second fault cause description information used to describe the cause of occurrence of the second abnormal event is determined based on the information about the second abnormal event. When a fault propagation relationship between the first abnormal event and the second abnormal event is considered, not only the identifier of the first abnormal event and the identifier of the second abnormal event are considered, but also the causes of occurrence of the first abnormal event and the second abnormal event are considered, thereby determining that the first abnormal event corresponding to the first fault cause description information is a cause event that causes occurrence of the second abnormal event corresponding to the second fault cause description information, so that a result of determining the fault propagation relationship is more refined and accurate, and accuracy of network fault analysis is improved.

Figure 9:
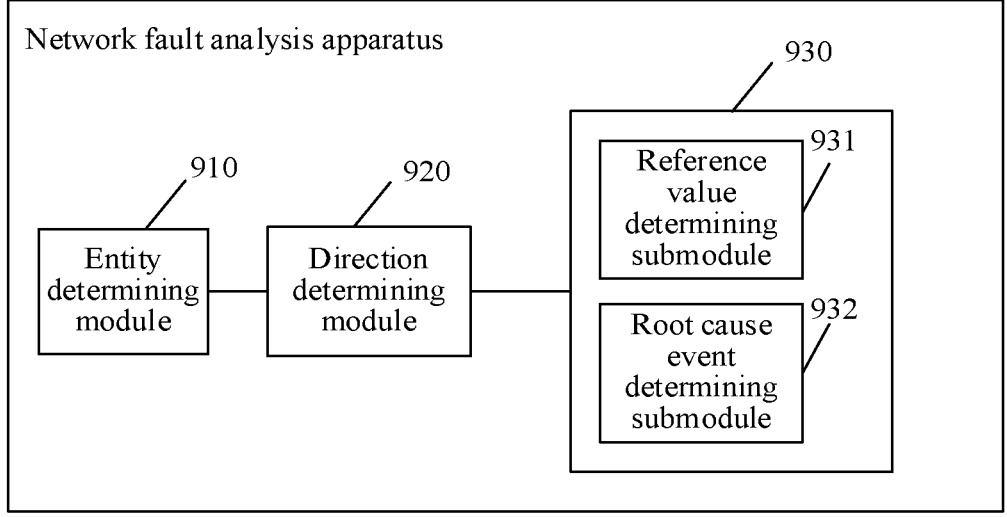
FIG. 9 is a schematic diagram of a structure of another network fault analysis apparatus according to an example embodiment of this application.

FIG. 9 is a diagram of a structure of a network fault analysis apparatus according to an embodiment of this application. The apparatus may be implemented as a part of the apparatus or the entire apparatus by using software, hardware, or a combination thereof. The apparatus provided in this embodiment of this application can implement the process in FIG. 7 in embodiments of this application. As shown in FIG. 9, the apparatus includes: an entity determining module 910, a direction determining module 920, and a root cause event determining module 930. The entity determining module 910 is configured to determine entities associated with a plurality of abnormal events to obtain an entity set. The direction determining module 920 is configured to determine, by using the method shown in FIG. 2, a fault propagation direction between a seventh abnormal event associated with a third entity and an eighth abnormal event associated with a fourth entity in case of corresponding fault cause description information, where the third entity and the fourth entity are any two mutually associated entities in the entity set, the seventh abnormal event is any one of at least one abnormal event associated with the third entity, and the eighth abnormal event is any one of at least one abnormal event associated with the fourth entity. The root cause event determining module 930 is configured to determine a root cause event in the plurality of abnormal events based on the determined fault propagation direction.

In some examples, the root cause event determining module 930 includes a reference value determining submodule 931 and a root cause event determining submodule 932. The reference value determining submodule 931 is configured to determine a reference value of each of the abnormal events based on the determined fault propagation direction, where the reference value is a sum of weights of fault propagation directions in which the abnormal event is used as a result event, and the weight of the fault propagation direction is used to indicate a probability that a corresponding fault propagation direction is true. The root cause event determining submodule 932 is configured to determine an abnormal event with a minimum reference value as the root cause event in the plurality of abnormal events.

Division into the modules in this embodiment of this application is an example, and is merely logical function division. During actual implementation, another division manner may be used. In addition, the functional modules in embodiments of this application may be integrated in one processor, or may exist as physically independent. Alternatively, two or more modules may be integrated into one module. The integrated module may be implemented in a form of hardware, or may be implemented in a form of a software functional module.

When the integrated module is implemented in the form of a software function module and sold or used as an independent product, the integrated module may be stored in a computer-readable storage medium. Based on such an understanding, the technical solutions of this application essentially, or the part contributing to the conventional technology, or all or a part of the technical solutions may be embodied in a form of a software product. The computer software product is stored in a storage medium, and includes several instructions for instructing a terminal device (which may be a personal computer, a mobile phone, a network device, or the like) or a processor to perform all or some steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

It should be noted that when the network fault analysis apparatus provided in the foregoing embodiments performs network fault analysis, division of the foregoing function modules is merely used as an example for description. In actual application, the foregoing functions may be allocated to different function modules for implementation as required, that is, an internal structure of the apparatus is divided into different function modules, to implement all or some of the functions described above. In addition, the network fault analysis apparatus provided in the foregoing embodiments pertains to a same concept as the network fault analysis method embodiment. For a specific implementation process of the network fault analysis apparatus, refer to the method embodiment. Details are not described herein again.

Figure 10:
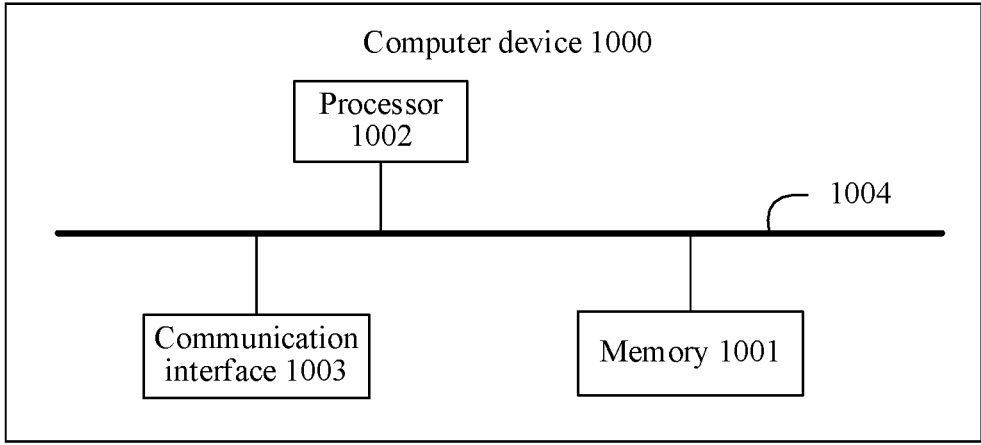
FIG. 10 is a schematic diagram of a structure of a computer device according to an example embodiment of this application.

An embodiment of this application further provides a computer device. FIG. 10 provides an example of a possible architectural diagram of a computer device 1000.

The computer device 1000 includes a memory 1001, a processor 1002, a communication interface 1003, and a bus 1004. The memory 1001, the processor 1002, and the communication interface 1003 are communicatively connected to each other through the bus 1004.

The memory 1001 may be a read-only memory (ROM), a static storage device, a dynamic storage device, or a random access memory (RAM). The memory 1001 may store a program. When the program stored in the memory 1001 is executed by the processor 1002, the processor 1002 and the communication interface 1003 are configured to perform a network fault analysis method. The memory 1001 may further store a data set. For example, a part of storage resources in the memory 1001 are classified as a data set storage module, configured to store an extraction template, a first fault propagation relationship model, and a second fault propagation relationship model.

The processor 1002 may be a general-purpose central processing unit (CPU), a microprocessor, an application-specific integrated circuit (ASIC), a graphics processing unit (GPU), or one or more integrated circuits.

Alternatively, the processor 1002 may be an integrated circuit chip, and has a signal processing capability. In an implementation process, some or all functions of the network fault analysis apparatus in this application may be completed by using a hardware integrated logic circuit in the processor 1002 or instructions in a form of software. The processor 1002 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods disclosed in the foregoing embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1001, and the processor 1002 reads information in the memory 1001 and completes some functions of the network fault analysis apparatus in embodiments of this application in combination with hardware of the processor.

The communication interface 1003 uses a transceiver module, for example, but not limited to, a transceiver, to implement communication between the computer device 1000 and another device or a communication network. For example, information about an abnormal event, the extraction template, the first fault propagation relationship model, the second fault propagation relationship model, and the like may be obtained by using the communication interface 1003.

The bus 1004 may include a path for transmitting information between components (for example, the memory 1001, the processor 1002, and the communication interface 1003) of the computer device 1000.

The descriptions of procedures corresponding to the foregoing accompanying drawings have respective focuses. For a part that is not described in detail in a procedure, refer to related descriptions of another procedure.

An embodiment of this application further provides a computer-readable storage medium. The computer-readable storage medium stores computer instructions, and when the computer instructions stored in the computer-readable storage medium are executed by a computer device, the computer device is enabled to perform the network fault analysis method provided above.

An embodiment of this application further provides a computer program product including instructions. When the computer program product runs on a computer device, the computer device is enabled to perform the network fault analysis method provided above.

In the foregoing embodiment, all or a part of the software, hardware, firmware, or any combination thereof may be implemented. When the software is used for implementation, all or a part of the implementation may be implemented in a form of a computer program product. The computer program product includes one or more computer instructions. When the computer program instructions are loaded and executed on a server or a terminal, all or some of the processes or functions based on embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable media may be a magnetic medium (for example, a floppy disk, a hard disk drive, or a magnetic tape), an optical medium (for example, a digital video disk (DVD)), or a semiconductor medium (for example, a solid-state drive).

What is claimed is:

1. A method, wherein the method comprises:

obtaining first information about a first abnormal event and second information about a second abnormal event;

determining first fault cause description information based on the first information about the first abnormal event, wherein the first fault cause description information describes a first cause of occurrence of the first abnormal event, wherein the determining the first fault cause description information based on the first information about the first abnormal event comprises:

obtaining a first extraction template of a first network device, wherein the first network device sends the first information about the first abnormal event, and the first extraction template comprises a first event identifier and a first fault code keyword;

extracting a first fault code from the first information about the first abnormal event based on the first event identifier and the first fault code keyword in the first extraction template and the first information about the first abnormal event, to obtain a first extraction result; and determining the first fault cause description information based on the first extraction result;

determining second fault cause description information based on the second information about the second abnormal event, wherein the second fault cause description information describes a second cause of occurrence of the second abnormal event, wherein the determining the second fault cause description information based on the second information about the second abnormal event comprises:

obtaining a second extraction template of a second network device, wherein the second network device sends the second information about the second abnormal event, and the second extraction template comprises a second event identifier and a second fault code keyword;

extracting a second fault code from the second information about the second abnormal event based on the second event identifier and the second fault code keyword in the second extraction template and the second information about the second abnormal event, to obtain a second extraction result; and determining the second fault cause description information based on the second extraction result; and determining, based on the first event identifier in the first information about the first abnormal event, the second event identifier in the second information about the second abnormal event, the first fault cause description information, and the second fault cause description information, a fault propagation direction between the first abnormal event corresponding to the first fault cause description information and the second abnormal event corresponding to the second fault cause description information to increase accuracy of a network fault analysis result.

2. The method according to claim 1, wherein the determining, based on the first event identifier in the first information about the first abnormal event, the second event identifier in the second information about the second abnormal event, the first fault cause description information, and the second fault cause description information, the fault propagation direction between the first abnormal event corresponding to the first fault cause description information and the second abnormal event corresponding to the second fault cause description information comprises:

obtaining a first fault propagation relationship model, wherein the first fault propagation relationship model comprises a plurality of first fault propagation relationships, and a first fault propagation relationship records a corresponding fault propagation direction between two abnormal events in case of corresponding fault cause description information; and in response to determining that a first target fault propagation relationship exists in the first fault propagation relationship model, determining, based on the first target fault propagation relationship, the fault propagation direction between the first abnormal event corresponding to the first fault cause description information and the second abnormal event corresponding to the second fault cause description information, wherein the first target fault propagation relationship comprises the first event identifier in the first information about the first abnormal event, the second event identifier in the second information about the second abnormal event, the first fault cause description information, and the second fault cause description information.

3. The method according to claim 1, wherein the determining, based on the first event identifier in the first information about the first abnormal event, the second event identifier in the second information about the second abnormal event, the first fault cause description information, and the second fault cause description information, the fault propagation direction between the first abnormal event corresponding to the first fault cause description information and the second abnormal event corresponding to the first fault cause description information and the second abnormal event corresponding to the second fault cause description information comprises:

obtaining a first fault propagation relationship model, wherein the first fault propagation relationship model comprises a plurality of first fault propagation relationships, and a first fault propagation relationship records a corresponding fault propagation direction between two abnormal events in case of corresponding fault cause description information; and in response to determining that a first target fault propagation relationship does not exist in the first fault propagation relationship model, obtaining a second fault propagation relationship model, wherein the first target fault propagation relationship comprises the first event identifier in the first information about the first abnormal event, the second event identifier in the second information about the second abnormal event, the first fault cause description information, and the second fault cause description information, the second fault propagation relationship model comprises a plurality of second fault propagation relationships, a second fault propagation relationship records a possible fault propagation direction between the two abnormal events in case of the corresponding fault cause description information, and the second fault propagation relationship model is generated based on the first fault propagation relationship model; and in response to determining that a second target fault propagation relationship exists in the second fault propagation relationship model, determining, based on the second target fault propagation relationship, the fault propagation direction between the first abnormal event corresponding to the first fault cause description information and the second abnormal event corresponding to the second fault cause description information, wherein the second target fault propagation relationship comprises the first event identifier in the first information about the first abnormal event, the second event identifier in the second information about the second abnormal event, the first fault cause description information, and the second fault cause description information.

4. The method according to claim 3, wherein the method further comprises:

checking the second target fault propagation relationship after the determining, based on the second target fault propagation relationship, the fault propagation direction between the first abnormal event corresponding to the first fault cause description information and the second abnormal event corresponding to the second fault cause description information; and updating the first fault propagation relationship model and the second fault propagation relationship model based on the checked second target fault propagation relationship.

5. The method according to claim 3, wherein the first fault propagation relationship in the first fault propagation relationship model is generated based on:

determining a third abnormal event on a first entity, third fault cause description information describing a third cause of occurrence of the third abnormal event, a fourth abnormal event on a second entity, and fourth fault cause description information describing a fourth cause of occurrence of the fourth abnormal event, wherein the first entity and the second entity are mutually associated; and determining, based on expert annotation, a cause event and a result event in the third abnormal event corresponding to the third fault cause description information and the fourth abnormal event corresponding to the fourth fault cause description information, to obtain the first fault propagation relationship.

6. The method according to claim 3, wherein the second fault propagation relationship in the second fault propagation relationship model is generated based on:

determining a fifth abnormal event with unknown fault cause description information, wherein in case of the unknown fault cause description information is of a corresponding abnormal event other than known fault cause description information, and the known fault cause description information is in a first fault propagation relationship associated with the corresponding abnormal event;

calculating a first similarity between the unknown fault cause description information of the fifth abnormal event and each piece of known fault cause description information of the fifth abnormal event, to obtain a first similarity set; and determining, based on the first similarity set, a first probability that the second fault propagation relationship corresponding to the fifth abnormal event in case of the unknown fault cause description information is established.

7. The method according to claim 6, wherein the determining, based on the first similarity set, the first probability that the second fault propagation relationship corresponding to the fifth abnormal event in case of the unknown fault cause description information is established comprises at least one of:

determining, based on the first similarity greater than a first similarity threshold in the first similarity set and a second similarity greater than a second similarity threshold in a second similarity set, a second probability that the second fault propagation relationship between the fifth abnormal event and a sixth abnormal event and that is based on the unknown fault cause description information of the fifth abnormal event and the unknown fault cause description information of the sixth abnormal event is established, wherein the second similarity set is between the unknown fault cause description information of the sixth abnormal event and all known fault cause description information of the sixth abnormal event;

determining, based on the first similarity greater than the first similarity threshold in the first similarity set, the second probability that the second fault propagation relationship between the fifth abnormal event and the sixth abnormal event and that is based on the unknown fault cause description information of the fifth abnormal event and the known fault cause description information of the sixth abnormal event is established;

in response to determining that none of first similarities in the first similarity set is greater than the first similarity threshold, determining, based on a quantity of first fault propagation relationships associated with the fifth abnormal event and the sixth abnormal event, the second probability that the second fault propagation relationship between the fifth abnormal event and the sixth abnormal event and that is based on the unknown fault cause description information of the fifth abnormal event and the unknown fault cause description information of the sixth abnormal event is established; or in response to determining that none of the first similarities in the first similarity set is greater than the first similarity threshold, determining, based on the quantity of the first fault propagation relationships associated with the fifth abnormal event and the sixth abnormal event, the second probability that the second fault propagation relationship between the fifth abnormal event and the sixth abnormal event and that is based on the unknown fault cause description information of the fifth abnormal event and the known fault cause description information of the sixth abnormal event is established.

8. The method according to claim 7,
wherein the determining, based on the first similarity greater than the first similarity threshold in the first similarity set and the second similarity greater than the second similarity threshold in the second similarity set, the second probability that the second fault propagation relationship between the fifth abnormal event and the sixth abnormal event and that is based on the unknown fault cause description information of the fifth abnormal event and the unknown fault cause description information of the sixth abnormal event is established comprises:

determining first fault propagation relationships between the fifth abnormal event associated with known fault cause description information corresponding to the first similarities greater than the first similarity threshold and the sixth abnormal event associated with the known fault cause description information corresponding to second similarities greater than the second similarity threshold, to obtain a first relationship set;

determining, based on the first similarities and the second similarities that correspond to the first fault propagation relationships in the first relationship set, first weights corresponding to the first fault propagation relationships in the first relationship set;

determining, based on the first similarities and the second similarities that correspond to first fault propagation relationships in the first relationship set and that indicate that the fifth abnormal event causes the sixth abnormal event, second weights corresponding to the first fault propagation relationships in the first relationship set and that indicate that the fifth abnormal event causes the sixth abnormal event; and calculating, based on a first sum of the first weights corresponding to the first fault propagation relationships in the first relationship set and a second sum of the second weights corresponding to the first fault propagation relationships in the first relationship set, a third probability that the fifth abnormal event causes the sixth abnormal event; or wherein the determining, based on the first similarity greater than the first similarity threshold in the first similarity set and the second similarity greater than the second similarity threshold in the second similarity set, the second probability that the second fault propagation relationship between the fifth abnormal event and the sixth abnormal event and that is based on the unknown fault cause description information of the fifth abnormal event and the unknown fault cause description information of the sixth abnormal event is established comprises:

determining the first fault propagation relationships between the fifth abnormal event associated with the known fault cause description information corresponding to first similarities greater than the first similarity threshold and the sixth abnormal event associated with the known fault cause description information corresponding to the second similarities greater than the second similarity threshold, to obtain the first relationship set;

determining, based on the first similarities and the second similarities that correspond to the first fault propagation relationships in the first relationship set, the first weights corresponding to the first fault propagation relationships in the first relationship set;

determining, based on the first similarities and the second similarities that correspond to the first fault propagation relationships in the first relationship set and that indicate that the sixth abnormal event causes the fifth abnormal event, fifth weights corresponding to the first fault propagation relationships in the first relationship set and that indicate that the sixth abnormal event causes the fifth abnormal event; and calculating, based on the first sum of the first weights corresponding to the first fault propagation relationships in the first relationship set and the second sum of the fifth weights corresponding to the first fault propagation relationships in the first relationship set, a probability that the sixth abnormal event causes the fifth abnormal event.

9. The method according to claim 7,
wherein the determining, based on the first similarity greater than the first similarity threshold in the first similarity set, the second probability that the second fault propagation relationship between the fifth abnormal event and the sixth abnormal event and that is based on the unknown fault cause description information of the fifth abnormal event and the known fault cause description information of the sixth abnormal event is established comprises:

determining first fault propagation relationships associated with known fault cause description information of the fifth abnormal event corresponding to the first similarities greater than the first similarity threshold and the known fault cause description information of the sixth abnormal event, to obtain a second relationship set;

determining, based on the first similarities that correspond to the first fault propagation relationships in the second relationship set, first weights corresponding to the first fault propagation relationships in the second relationship set;

determining, based on first similarities that correspond to the first fault propagation relationships in the second relationship set and that indicate that the fifth abnormal event causes the sixth abnormal event, second weights corresponding to the first fault propagation relationships in the second relationship set and that indicate that the fifth abnormal event causes the sixth abnormal event; and calculating, based on a first sum of the first weights corresponding to the first fault propagation relationships in the second relationship set and a second sum of the second weights corresponding to the first fault propagation relationships in the second relationship set, a third probability that the fifth abnormal event causes the sixth abnormal event; or wherein the determining, based on the first similarity greater than the first similarity threshold in the first similarity set, the second probability that the second fault propagation relationship between the fifth abnormal event and the sixth abnormal event and that is based on the unknown fault cause description information of the fifth abnormal event and the known fault cause description information of the sixth abnormal event is established comprises:

determining the first fault propagation relationships associated with the known fault cause description information of the fifth abnormal event corresponding to the first similarities greater than the first similarity threshold and the known fault cause description information of the sixth abnormal event, to obtain the second relationship set;

determining, based on the first similarities that correspond to the first fault propagation relationships in the second relationship set, the first weights corresponding to the first fault propagation relationships in the second relationship set;

determining, based on the first similarities that correspond to the first fault propagation relationships in the second relationship set and that indicate that the sixth abnormal event causes the fifth abnormal event, fifth weights corresponding to the first fault propagation relationships in the second relationship set and that indicate that the sixth abnormal event causes the fifth abnormal event; and calculating, based on the first sum of the first weights corresponding to the first fault propagation relationships in the second relationship set and the second sum of the fifth weights corresponding to the first fault propagation relationships in the second relationship set, a probability that the sixth abnormal event causes the fifth abnormal event.

10. The method according to claim 1, wherein the method further comprises:

determining a cause description keyword in a product manual of a target network device;

extracting template content from the product manual of the target network device based on the cause description keyword; and generating a target extraction template based on the template content, wherein the target network device is the first network device, and the target extraction template is the first extraction template; or wherein the target network device is the second network device, and the target extraction template is the second extraction template.

11. An apparatus, wherein the apparatus comprises:

a non-transitory memory storing instructions; and a processor coupled to the non-transitory memory, wherein the instructions, when executed by the processor, cause the apparatus to be configured to perform operations including:

obtaining first information about a first abnormal event and second information about a second abnormal event;

determining first fault cause description information based on the first information about the first abnormal event, wherein the first fault cause description information describes a first cause of occurrence of the first abnormal event, wherein the determining the first fault cause description information based on the first information about the first abnormal event comprises:

obtaining a first extraction template of a first network device, wherein the first network device sends the first information about the first abnormal event, and the first extraction template comprises a first event identifier and a first fault code keyword;

extracting a first fault code from the first information about the first abnormal event based on the first event identifier and the first fault code keyword in the first extraction template and the first information about the first abnormal event, to obtain a first extraction result; and determining the first fault cause description information based on the first extraction result;

determining second fault cause description information based on the second information about the second abnormal event, wherein the second fault cause description information describes a second cause of occurrence of the second abnormal event, wherein the determining the second fault cause description information based on the second information about the second abnormal event comprises:

obtaining a second extraction template of a second network device, wherein the second network device sends the second information about the second abnormal event, and the second extraction template comprises a second event identifier and a second fault code keyword;

extracting a second fault code from the second information about the second abnormal event based on the second event identifier and the second fault code keyword in the second extraction template and the second information about the second abnormal event, to obtain a second extraction result; and determining the second fault cause description information based on the second extraction result; and determining, based on the first event identifier in the first information about the first abnormal event, the second event identifier in the second information about the second abnormal event, the first fault cause description information, and the second fault cause description information, a fault propagation direction between the first abnormal event corresponding to the first fault cause description information and the second abnormal event corresponding to the second fault cause description information to increase accuracy of a network fault analysis result.

12. The apparatus according to claim 11, wherein the determining, based on the first event identifier in the first information about the first abnormal event, the second event identifier in the second information about the second abnormal event, the first fault cause description information, and the second fault cause description information, the fault propagation direction between the first abnormal event corresponding to the first fault cause description information and the second abnormal event corresponding to the second fault cause description information comprises:

obtaining a first fault propagation relationship model, wherein the first fault propagation relationship model comprises a plurality of first fault propagation relationships, and a first fault propagation relationship records a corresponding fault propagation direction between two abnormal events in case of corresponding fault cause description information; and in response to determining that a first target fault propagation relationship exists in the first fault propagation relationship model, determining, based on the first target fault propagation relationship, the fault propagation direction between the first abnormal event corresponding to the first fault cause description information and the second abnormal event corresponding to the second fault cause description information, wherein the first target fault propagation relationship comprises the first event identifier in the first information about the first abnormal event, the second event identifier in the second information about the second abnormal event, the first fault cause description information, and the second fault cause description information.

13. The apparatus according to claim 11, wherein the determining, based on the first event identifier in the first information about the first abnormal event, the second event identifier in the second information about the second abnormal event, the first fault cause description information, and the second fault cause description information, the fault propagation direction between the first abnormal event corresponding to the first fault cause description information and the second abnormal event corresponding to the second fault cause description information comprises:

obtaining a first fault propagation relationship model, wherein the first fault propagation relationship model comprises a plurality of first fault propagation relationships, and a first fault propagation relationship records a corresponding fault propagation direction between two abnormal events in case of corresponding fault cause description information; and in response to determining that a first target fault propagation relationship does not exist in the first fault propagation relationship model, obtaining a second fault propagation relationship model, wherein the first target fault propagation relationship comprises the first event identifier in the first information about the first abnormal event, the second event identifier in the second information about the second abnormal event, the first fault cause description information, and the second fault cause description information, the second fault propagation relationship model comprises a plurality of second fault propagation relationships, a second fault propagation relationship records a possible fault propagation direction between the two abnormal events in case of the corresponding fault cause description information, and the second fault propagation relationship model is generated based on the first fault propagation relationship model; and in response to determining that a second target fault propagation relationship exists in the second fault propagation relationship model, determining, based on the second target fault propagation relationship, the fault propagation direction between the first abnormal event corresponding to the first fault cause description information and the second abnormal event corresponding to the second fault cause description information, wherein the second target fault propagation relationship comprises the first event identifier in the first information about the first abnormal event, the second event identifier in the second information about the second abnormal event, the first fault cause description information, and the second fault cause description information.

14. The apparatus according to claim 13, the operations further comprising:

checking the second target fault propagation relationship after the determining, based on the second target fault propagation relationship, the fault propagation direction between the first abnormal event corresponding to the first fault cause description information and the second abnormal event corresponding to the second fault cause description information; and updating the first fault propagation relationship model and the second fault propagation relationship model based on the checked second target fault propagation relationship.

15. The apparatus according to claim 13, wherein the first fault propagation relationship in the first fault propagation relationship model is generated based on:

determining a third abnormal event on a first entity, third fault cause description information describing a third cause of occurrence of the third abnormal event, a fourth abnormal event on a second entity, and fourth fault cause description information describing a fourth cause of occurrence of the fourth abnormal event, wherein the first entity and the second entity are mutually associated; and determining, based on expert annotation, a cause event and a result event in the third abnormal event corresponding to the third fault cause description information and the fourth abnormal event corresponding to the fourth fault cause description information, to obtain the first fault propagation relationship.

16. The apparatus according to claim 13, wherein the second fault propagation relationship in the second fault propagation relationship model is generated based on:

determining a fifth abnormal event with unknown fault cause description information, wherein in case of the unknown fault cause description information is of a corresponding abnormal event other than known fault cause description information, and the known fault cause description information is in a first fault propagation relationship associated with the corresponding abnormal event;

calculating a first similarity between the unknown fault cause description information of the fifth abnormal event and each piece of known fault cause description information of the fifth abnormal event, to obtain a first similarity set; and determining, based on the first similarity set, a first probability that the second fault propagation relationship corresponding to the fifth abnormal event in case of the unknown fault cause description information is established.

17. The apparatus according to claim 16, wherein the determining, based on the first similarity set, the first probability that the second fault propagation relationship corresponding to the fifth abnormal event in case of the unknown fault cause description information is established comprises at least one of:

determining, based on the first similarity greater than a first similarity threshold in the first similarity set and a second similarity greater than a second similarity threshold in a second similarity set, a second probability that the second fault propagation relationship between the fifth abnormal event and a sixth abnormal event and that is based on the unknown fault cause description information of the fifth abnormal event and the unknown fault cause description information of the sixth abnormal event is established, wherein the second similarity set is between the unknown fault cause description information of the sixth abnormal event and all known fault cause description information of the sixth abnormal event;

determining, based on the first similarity greater than the first similarity threshold in the first similarity set, the second probability that the second fault propagation relationship between the fifth abnormal event and the sixth abnormal event and that is based on the unknown fault cause description information of the fifth abnormal event and the known fault cause description information of the sixth abnormal event is established;

in response to determining that none of first similarities in the first similarity set is greater than the first similarity threshold, determining, based on a quantity of first fault propagation relationships associated with the fifth abnormal event and the sixth abnormal event, the second probability that the second fault propagation relationship between the fifth abnormal event and the sixth abnormal event and that is based on the unknown fault cause description information of the fifth abnormal event and the unknown fault cause description information of the sixth abnormal event is established; or in response to determining that none of the first similarities in the first similarity set is greater than the first similarity threshold, determining, based on the quantity of the first fault propagation relationships associated with the fifth abnormal event and the sixth abnormal event, the second probability that the second fault propagation relationship between the fifth abnormal event and the sixth abnormal event and that is based on the unknown fault cause description information of the fifth abnormal event and the known fault cause description information of the sixth abnormal event is established.

18. The apparatus according to claim 17, wherein the determining, based on the first similarity greater than the first similarity threshold in the first similarity set and the second similarity greater than the second similarity threshold in the second similarity set, the second probability that the second fault propagation relationship between the fifth abnormal event and the sixth abnormal event and that is based on the unknown fault cause description information of the fifth abnormal event and the unknown fault cause description information of the sixth abnormal event is established comprises:

determining first fault propagation relationships between the fifth abnormal event associated with known fault cause description information corresponding to the first similarities greater than the first similarity threshold and the sixth abnormal event associated with the known fault cause description information corresponding to second similarities greater than the second similarity threshold, to obtain a first relationship set;

determining, based on the first similarities and the second similarities that correspond to the first fault propagation relationships in the first relationship set, first weights corresponding to the first fault propagation relationships in the first relationship set;

determining, based on the first similarities and the second similarities that correspond to first fault propagation relationships in the first relationship set and that indicate that the fifth abnormal event causes the sixth abnormal event, second weights corresponding to the first fault propagation relationships in the first relationship set and that indicate that the fifth abnormal event causes the sixth abnormal event; and calculating, based on a first sum of the first weights corresponding to the first fault propagation relationships in the first relationship set and a second sum of the second weights corresponding to the first fault propagation relationships in the first relationship set, a probability that the fifth abnormal event causes the sixth abnormal event; or wherein the determining, based on the first similarity greater than the first similarity threshold in the first similarity set and the second similarity greater than the second similarity threshold in the second similarity set, the second probability that the second fault propagation relationship between the fifth abnormal event and the sixth abnormal event and that is based on the unknown fault cause description information of the fifth abnormal event and the unknown fault cause description information of the sixth abnormal event is established comprises:

determining the first fault propagation relationships between the fifth abnormal event associated with the known fault cause description information corresponding to the first similarities greater than the first similarity threshold and the sixth abnormal event associated with the known fault cause description information corresponding to the second similarities greater than the second similarity threshold, to obtain the first relationship set;

determining, based on the first similarities and the second similarities that correspond to the first fault propagation relationships in the first relationship set, the first weights corresponding to the first fault propagation relationships in the first relationship set;

determining, based on the first similarities and the second similarities that correspond to the first fault propagation relationships in the first relationship set and that indicate that the sixth abnormal event causes the fifth abnormal event, fifth weights corresponding to the first fault propagation relationships in the first relationship set and that indicate that the sixth abnormal event causes the fifth abnormal event; and calculating, based on the first sum of the first weights corresponding to the first fault propagation relationships in the first relationship set and the second sum of the fifth weights corresponding to the first fault propagation relationships in the first relationship set, a probability that the sixth abnormal event causes the fifth abnormal event.

* * * * *